United States Patent
Chiang et al.

(10) Patent No.: US 10,757,612 B2
(45) Date of Patent: *Aug. 25, 2020

(54) CONTROLLING FALLBACK PROCEDURES FOR DIFFERENT USER GROUPS OR DEVICE GROUPS

(71) Applicant: T-Mobile USA, Inc., Bellevue, WA (US)

(72) Inventors: Hsin-Fu Henry Chiang, Bellevue, WA (US); Jun Liu, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/203,481

(22) Filed: Nov. 28, 2018

(65) Prior Publication Data

US 2019/0281506 A1    Sep. 12, 2019

Related U.S. Application Data

(63) Continuation-in-part of application No. 15/913,665, filed on Mar. 6, 2018, now Pat. No. 10,492,243.

(51) Int. Cl.
*H04W 76/18* (2018.01)
*H04L 29/06* (2006.01)
(Continued)

(52) U.S. Cl.
CPC ..... *H04W 36/0022* (2013.01); *H04L 65/1006* (2013.01); *H04L 65/1016* (2013.01);
(Continued)

(58) Field of Classification Search
None
See application file for complete search history.

(56) References Cited

U.S. PATENT DOCUMENTS

2010/0329244 A1* 12/2010 Buckley ............. H04L 65/1016
                                                                370/352
2012/0069731 A1    3/2012 Tooher et al.
(Continued)

FOREIGN PATENT DOCUMENTS

KR    20150111236 A    10/2015

OTHER PUBLICATIONS

The PCT Search Report and Written Opinion dated Jun. 12, 2019 for PCT Application No. PCT/US2019/018749, 11 pages.
(Continued)

*Primary Examiner* — Eunsook Choi
(74) *Attorney, Agent, or Firm* — Lee & Hayes, P.C.

(57) ABSTRACT

A user equipment (UE) and an Internet Protocol (IP) Multimedia Subsystem (IMS) node may exchange fallback indicators in SIP signaling for purposes of controlling fallback procedures implemented by the UE. The SIP signaling may include a SIP request from the UE that includes first information. The IMS node can evaluate a criterion based on the first information, and, if the criterion is met, the IMS node may authorize (or prohibit) the use of a UE-supported fallback radio access technology (RAT) that corresponds to a fallback indicator also included in the SIP request. Based on the evaluation of the criterion, the IMS node may respond to the UE with a SIP response that includes second information indicating which of the supported Fallback RATs the UE is authorized to use (if any), and which of the supported Fallback RATs the UE is not authorized to use (if any).

20 Claims, 13 Drawing Sheets

(51) Int. Cl.
  *H04W 36/00* (2009.01)
  *H04W 48/18* (2009.01)
  *H04W 12/00* (2009.01)
  *H04W 76/19* (2018.01)
  *H04W 8/26* (2009.01)

(52) U.S. Cl.
  CPC ........... *H04L 65/1066* (2013.01); *H04W 8/26* (2013.01); *H04W 12/00503* (2019.01); *H04W 12/00512* (2019.01); *H04W 48/18* (2013.01); *H04W 76/19* (2018.02)

(56) References Cited

U.S. PATENT DOCUMENTS

| | | |
|---|---|---|
| 2012/0122459 A1 | 5/2012 | Wu et al. |
| 2013/0017805 A1 | 1/2013 | Andre-Jonsson et al. |
| 2015/0245388 A1 | 8/2015 | Yerrabommanahalli et al. |
| 2016/0021579 A1 | 1/2016 | Mufti |
| 2016/0135089 A1 | 5/2016 | Catovic et al. |
| 2016/0262006 A1 | 9/2016 | Keller et al. |
| 2017/0332300 A1 | 11/2017 | Choi et al. |
| 2018/0035335 A1* | 2/2018 | Wallis ................. H04L 65/1016 |
| 2019/0281647 A1 | 9/2019 | Chiang et al. |

OTHER PUBLICATIONS

The PCT Search Report and Written Opinion dated Mar. 5, 2020, for PCT Application No. PCT/US2019/061993, 10 pages.

\* cited by examiner

US 10,757,612 B2

CONTROLLING FALLBACK PROCEDURES FOR DIFFERENT USER GROUPS OR DEVICE GROUPS

CROSS REFERENCE TO RELATED APPLICATIONS

This is a continuation-in-part application of commonly assigned, co-pending U.S. patent application Ser. No. 15/913,665, filed on Mar. 6, 2018. Application Ser. No. 15/913,665 is fully incorporated herein by reference.

BACKGROUND

Cellular networks are constantly evolving. For example, fifth generation (5G) networks are evolving from fourth generation (4G) Long Term Evolution (LTE) networks, which, in turn, evolved from third generation (3G), and second generation (2G) networks. Because the evolution of these technologies takes time, today's cellular networks are "heterogeneous" by employing a mixture of newer (e.g., 5G) and legacy (e.g., 4G/3G/2G) radio access technology (RAT) systems. This heterogeneous quality of cellular networks is likely to exist in future cellular networks as well. Even though a user equipment (UE) may employ the latest cellular radio technology, the UE often continues to support legacy RAT systems for various reasons.

Upon 5G's official deployment, 5G-compliant UEs will prefer to use a 5G RAT system and core network to establish communication sessions. This is because 5G technology promises to offer relatively high capacity, reliability, and data throughput as compared to the available legacy RATs. In most UEs, a choice of which RAT system to employ depends primarily on which RATs are available to the UE at its present geographic location. Nevertheless, when a 5G RAT is available, and a communication session (e.g., a voice call) is established using a 5G RAT, it is still possible for something to go wrong. For instance, an issue with the telecommunications network itself (e.g., the data core, the IP Multimedia Subsystem (IMS) core, etc.) may render a 5G-compliant UE unable to establish a session using the 5G RAT.

In 5G, however, fallback procedures are largely nonexistent due to the fact that the 5G core network is not backwards compatible with existing 4G technology. Moreover, Circuit Switched Fallback (CSFB) procedures are not supported by the 5G network. If a traditional fallback approach is adopted for 5G-compliant UEs—say one that is similar to the approach in CSFB—one might expect such a programmed UE to always retry a failed 5G communication session using an available legacy RAT(s), if one is available. In this approach, if repeated fallback attempts are unsuccessful, computing resources (e.g., processing resources, power resources, network bandwidth resources, etc.) may be wasted trying, but failing, to reattempt a communication session on a legacy RAT. The impact of this approach can be severe, especially considering the vast number of UEs that may be simultaneously retrying to establish respective 5G communication sessions that failed (e.g., when a widespread outage occurs). In addition to the unneeded resource consumption on the UE, this can place significant stress on a cellular network, especially when capacity for legacy sessions dwindles in the future due to an anticipated reduction in paid licenses, for example.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1A:
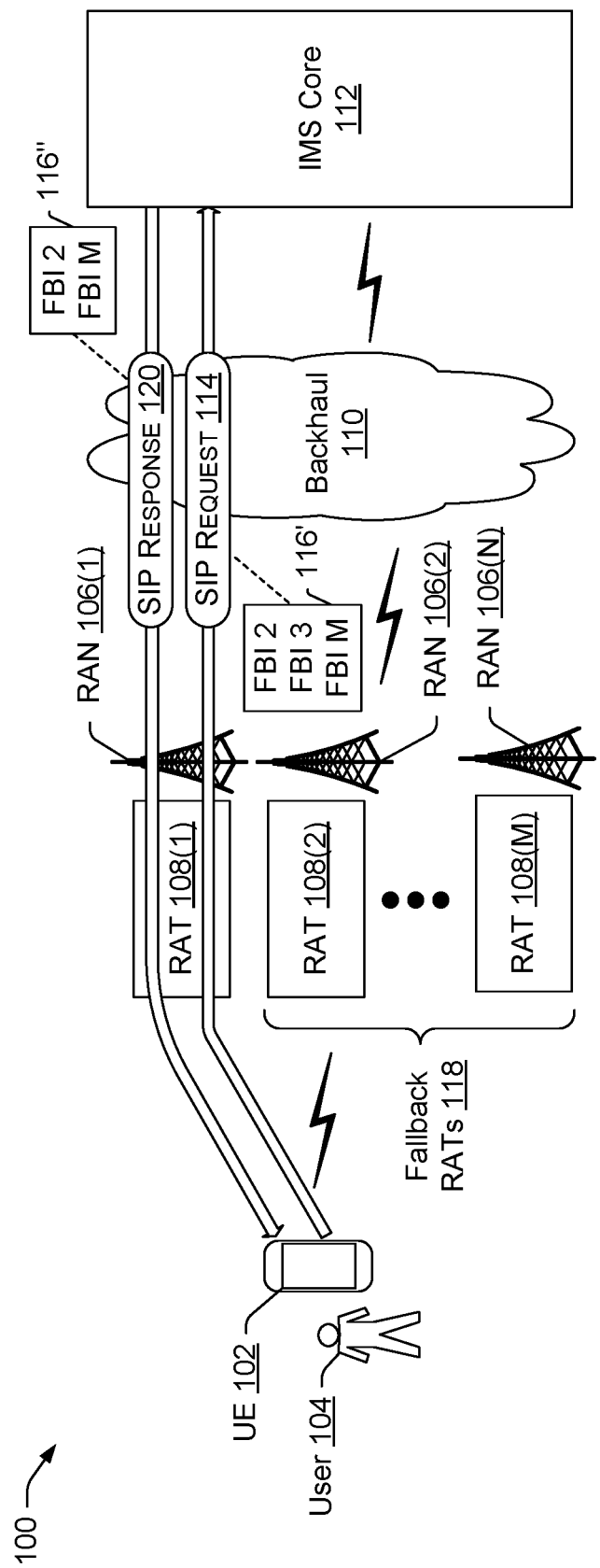
FIG. 1A is a diagram showing an example environment for implementing fallback indicators in Session Initiation Protocol (SIP) signaling.

Described herein are, among other things, techniques for a UE and an IMS node to exchange fallback indicators in SIP signaling for purposes of controlling fallback procedures implemented by the UE. By sending fallback indicators to an IMS node in a SIP request, a UE is able to inform the IMS node of its capabilities in regards to particular Fallback radio access technologies (RATs) that are supported by the UE. The IMS node may respond to the UE with a SIP response that includes information indicating which of the supported Fallback RATs the UE is authorized to use (if any), and which of the supported Fallback RATs the UE is not authorized to use (if any). In this way, the IMS node can control a fallback procedure at the UE by indicating which Fallback RATs are usable by the UE to reattempt communication sessions that cannot be established on an existing RAT.

In some implementations, the techniques and systems described herein can be implemented with a 5G network and a 5G-compliant UE. However, the techniques and systems are not limited to implementations with a 5G network, and a person having ordinary skill in the art can readily recognize that any current or future radio technology may benefit from the fallback control techniques and systems described herein. Accordingly, examples presented herein often refer to a voice-based communication session that utilizes a preferred RAT as a "voice over new radio (VoNR)" session/call, which is meant to cover 5G voice sessions/calls, as well as other current and/or future sessions/calls that use a different radio technology than 5G, yet one that can benefit from the techniques and systems described herein. That said, a VoNR session/call, as used herein, can be distinguished from a voice over LTE (VoLTE) call that uses a 4G RAT, and/or a voice over WiFi (VoWiFi) call that uses a wireless access point (AP) to establish a call. These and similar predecessor RATs can be considered, and are referred to herein as, "legacy RATs" or "Fallback RATs."

In some examples, an exchange of fallback indicators in SIP signaling may involve a UE informing an IMS node that the UE is capable of reattempting communication sessions using one or more Fallback RATs in the event that a particular RAT (which is available to, and preferred by, the UE) is no longer usable to establish a communication session. In an example, a 5G-compliant UE may inform an IMS node that the UE is capable of using a 4G LTE RAT, and/or a WiFi AP, and/or additional types of RATs, to reattempt a communication session. The UE can inform the IMS node of these capabilities by sending a SIP request to the IMS node over a telecommunications network, wherein the SIP request includes one or more fallback indicators corresponding to the Fallback RATs supported by the UE.

In response, the IMS node may indicate that it authorizes some, all, or none, of the Fallback RATs supported by the UE. To do this, the IMS node may send a SIP response that includes information indicating, for each UE-supported Fallback RAT, that the UE is either authorized, or not authorized, to reattempt communication sessions using that Fallback RAT. Thereafter, in the event that a communication session for the UE cannot be established using a particular RAT chosen for establishing the communication session, the UE is able to fallback to a Fallback RAT authorized by the IMS node in the SIP response.

In this manner, the techniques and systems disclosed herein can be thought of as a "network-controlled" fallback approach because the IMS node is the entity that determines which Fallback RATs the UE is authorized to use, if any, and the UE implements a fallback procedure that reattempts a failed attempt at establishing a communication session using a network-authorized Fallback RAT. Notably, the UE also refrains from trying to reattempt a failed attempt at establishing a communication session on a Fallback RAT that the network does not authorize the UE to use. This is notwithstanding the UE's support for an unauthorized Fallback RAT, which means that even though a UE may be configured to reattempt a communication session on a legacy RAT, the network may not authorize the UE to do so. This network-controlled fallback procedure can be implemented on a per-session (e.g., per-call) basis, meaning that the UE determines, for each communication session it attempts to establish, which Fallback RATs are authorized for use in the event of a communication session failure. Additionally, or alternatively, the network-controlled fallback procedure can be implemented prior to the setup of a communication session so that a UE can implement a common fallback procedure for multiple different communication sessions.

By exchanging fallback indicators in SIP signaling, one or more devices can be configured to conserve resources with respect to communications bandwidth resources, processing resources, memory resources, power resources, and/or other resources. For instance, if the network knows—before a call is even established—that fallback attempts using a particular Fallback RAT will be futile for a UE (e.g., when the UE is already using that RAT because a preferred RAT is unavailable, or when the network does not have capacity to handle fallback sessions from UEs on a particular Fallback RAT, etc.), the IMS node can inform the UE of this determination ahead of time in a SIP response so that the UE does not waste any time or resources trying to reattempt a communication session on the unauthorized Fallback RAT. This conserves processing resources, power resources, and network bandwidth resources on the UE because the UE does not waste processor cycles, and does not send network packets, in a futile reattempt(s) at establishing the communication session. On the network side, stopping UEs from falling back to particular RATs can provide the telecommunications network with more time when time matters most (e.g., when the network is trying to recover from a widespread outage). If the network is provided with ample time to recover from a widespread outage by suppressing fallback attempts from a large number of UEs, the network will recover quicker from an issue causing session failures using a preferred RAT system because it will not be stressed by a large number of UEs attempting to fallback during the outage. The techniques and systems described herein can also improve a user experience by resolving a failed communication session attempt quicker and avoiding long periods of silence for the end user while a UE might otherwise be trying, and failing, to fallback to a particular RAT. Additional technical effects can also be realized from an implementation of the technologies disclosed herein.

Also described herein are techniques for controlling fallback procedures for different user groups or different device groups. For instance, an IMS node may determine which Fallback RATs a UE is authorized (or not authorized) to use, if any, on the basis of information that is provided by the UE in a SIP request. This UE-provided information (referred to herein as "first information") can include, without limitation, a mobile country code (MCC)/mobile network code (MNC) tuple, a cell identifier (CID), a location identifier (ID) indicative of a geographic location, an International Mobile Subscriber Identity (IMSI), an International Mobile Equipment Identity (IMEI), and/or any combination thereof. Upon receiving the SIP request from the UE, the IMS node can determine whether a criterion is met based at least in part on the first information included in the SIP request. The evaluation of the criterion may be used either to authorize or to prohibit the use of a UE-supported Fallback RAT corresponding to a fallback indicator that is also included in the SIP request. For example, if the IMS node authorizes the use of a Fallback RAT based on the criterion being met, the IMS node may prohibit the use of the Fallback RAT based on the criterion not being met. Alternatively, if the IMS node prohibits the use of a Fallback RAT based on the criterion being met, the IMS node may authorize the use of the Fallback RAT based on the criterion not being met.

In this manner, any UE that provides first information meeting the criterion under evaluation can be uniformly treated in a first manner with respect to the authorization of a Fallback RAT, while other UEs that provide first information not meeting the criterion under evaluation may be uniformly treated in an opposite manner with respect to the authorization of the Fallback RAT. This allows for segmenting a user population or a device population into groups, and authorizing the use of a particular Fallback RAT(s) on a user-group or device-group basis. This means that a first group (of users or devices) can be authorized to reattempt communication sessions using a particular Fallback RAT, while a second group (of users or devices) can be prohibited from reattempting communication sessions using the particular Fallback RAT. In some embodiments, the fallback indicator included in a SIP request is associated with a particular type of communication session among multiple types of communication session, which allows for authorizing or prohibiting the use of a particular Fallback RAT exclusively for use in reattempting communication sessions of the particular type, and at a user-group or device-group level.

Controlling fallback procedures at a user-group or a device-group level allows for more flexibility in controlling which UEs are reattempting failed communication sessions on particular Fallback RATs (e.g., to fine tune the fallback control at different levels of granularity amongst a user population or a device population). This group-level control mechanism may be used for various purposes, such as to gradually authorize particular fallback procedures over time by rolling out fallback authorizations on the basis of user groups or device groups. It may also be used to account for variations in network capacity that are planned for network infrastructure in different geographic areas and/or for different user groups (e.g., users of mobile virtual network operator (MVNO) networks vs. users of a primary mobile network operator network).

Also described herein are systems and devices comprising one or more processors and one or more memories, as well as non-transitory computer-readable media storing computer-executable instructions that, when executed, by one or more processors perform various acts and/or processes disclosed herein.

Figure 1B:
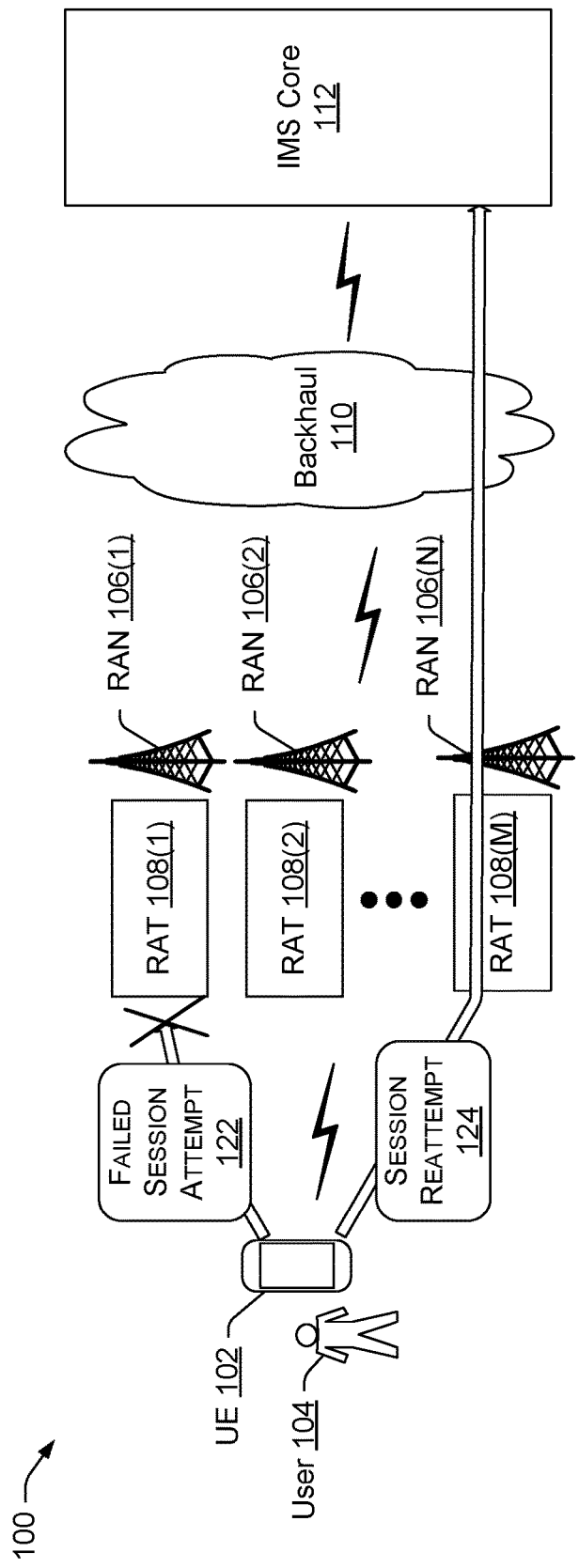
FIG. 1B is a diagram showing the example environment of FIG. 1A with a UE reattempting to establish a communication session using a network-authorized Fallback RAT.

FIGS. 1A and 1B are diagrams showing an example environment 100, at two different times, for implementing fallback indicators in SIP signaling. FIG. 1A illustrates the environment 100 at a time when a UE 102 may be performing a registration for IMS-based services, or a time when a user 104 of the UE 102 has initiated a communication session (e.g., dialed a number to call another user), and hence, the UE 102 may be trying to setup a communication session in FIG. 1A. Meanwhile, FIG. 1B illustrates the environment 100 at a time when the UE 102 is reattempting to establish a communication session (e.g., a voice call) after a session failure.

In accordance with various embodiments described herein, the terms "user equipment (UE)," "communication device," "device," "wireless communication device," "wireless device," "mobile device," "terminal," "wireless terminal," "mobile terminal," and "client device," may be used interchangeably herein to describe any UE (e.g., the UE 102) that is capable of transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), voice over New Radio (VoNR)—e.g., 5G, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

Furthermore, although the UE 102 is shown as a mobile phone or handset in FIGS. 1A and 1B, the UE 102 may be implemented as any suitable type of communication device configured to communicate over a telecommunications network, including, without limitation, a mobile phone (e.g., a smart phone) or a handset, a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar communication device. In addition, the UE 102 may be a mobile device, or the UE 102 may, alternatively, be a non-mobile (or situated) communication device including, without limitation, a television (smart television), a set-top-box (STB), a game console, a desktop computer, and the like.

In general, a user 104 can utilize the UE 102 to communicate with other users and devices via a telecommunications network. Such a telecommunications network may represent a network comprising a plurality of network nodes disposed between the UE 102 and another device or user terminal. In some cases, the telecommunications network may be inclusive of the other device(s) that is communicating with the UE 102, such as when the UE 102 communicates with an application server or a similar network node. It is to be appreciated that a telecommunications network over which the UE 102 communicates can include any suitable types, and numbers, of network nodes to enable the transmission of IP multimedia over the telecommunications network. FIGS. 1A and 1B show at least some suitable network nodes and systems that may constitute at least part of the telecommunications network. For example, the telecommunications network may include, without limitation, various radio access networks (RANs) 106(1)-(N) (e.g., eNodeB, cell towers, wireless access points (APs), etc.). Each RAN 106 may be associated with a corresponding RAT 108(1)-(M). The telecommunications network may further include, without limitation, a backhaul network 110, and a multimedia telephony (MMTel) and IP Multimedia Subsystem (IMS) architecture (sometimes referred to as the "IMS core" 112, the "IMS core network" 112, the "IMS network" 112, the "Core Network (CN)" 112, or the "IM CN Subsystem" 112). IMS is an architectural framework defined by the $3^{rd}$ Generation Partnership Project (3GPP) for delivering IP multimedia to UEs, such as the UE 102.

Various portions of the aforementioned telecommunications network can be maintained and/or operated by one or more service providers, such as one or more wireless carriers (sometimes referred to as "operators"), that provide IMS-based services to users (sometimes called "subscribers") who are associated with UEs (e.g., the UE 102) for accessing the IMS-based services to which they have subscribed. For example, a service provider may offer multimedia telephony services that allow a subscribed user 104 to call or message other users via the telecommunications network using his/her UE 102. A user 104 can also utilize an associated UE 102 to receive, provide, or otherwise interact with various different IMS-based services by accessing the IMS core 112. In this manner, a carrier may offer any type of IMS-based service(s), such as telephony services (or voice calling), emergency services (e.g., E911), gaming services, instant messaging services, presence services, video conferencing services, social networking and sharing services, location-based services, push-to-talk services, WiFi calling services, real time text (RTT) calling services, RTT video calling services, and so on. In order to access one or more of these services, the UE 102 is configured to request establishment of a communication session. Although many of the examples described herein relate to voice calling services, it is to be appreciated that the UE 102 may request establishment of any type of communication session.

Session Initiation Protocol (SIP) may be used for transmitting SIP messages before, during, or after a communication session (e.g., during the communication session in the signaling portion of the communication session, as opposed to the data or media stream portion of the communication session). Such SIP messages may include, without limitation, registration messages, session request messages, messages transmitted during the communication session, and the like, which are sent to the IMS core 112 of the telecommunications network, and received therefrom. SIP is a signaling protocol that can be used to establish, modify, and terminate communication sessions over packet networks, and to authenticate access to IMS-based services. As used herein, a "SIP request" is a message that is sent from a UE 102 to the IMS core 112 of the telecommunications network using SIP protocol, and a "SIP response" is a message that is sent from the IMS core 112 of the telecommunications network to a UE 102 using SIP protocol.

In FIG. 1A, the UE 102 is shown as sending a SIP request 114 to the IMS core 112 over the telecommunications network. The SIP request 114 may include one or more fallback indicators (FBIs) 116', which are used to inform a receiving IMS node of the UE's 102 capabilities in terms of the Fallback RATs 118 that the UE 102 supports. In an example, the first RAT 108(1) may represent a 5G RAT, and the UE 102 may be a 5G-compliant UE 102 that is configured to establish communication sessions using the 5G RAT 108(1). Meanwhile, the second RAT 108(2) may represent a 4G LTE RAT over which the UE 102 may be configured to establish a voice-based communication session as a VoLTE call. An intermediate RAT (say RAT 108(3), which is not shown in FIG. 1A) may represent a WiFi RAT over which the UE 102 may be configured to establish a voice-based communication session as a VoWiFi call. Lastly, the M$^{th}$ RAT 108(M) may represent a 3G or 2G RAT over which the UE 102 may establish a call over a circuit-switched network.

The UE 102 may prefer to use the first RAT 108(1), when available, because it may offer the latest technology that provides advantages over other available RATs 108(2)-(M). Meanwhile, the UE 102 may consider any individual predecessor (or legacy) RAT (e.g., RATs 108(2)-(M)) to be a Fallback RAT 118 that, if supported by the UE 102, is available to reattempt a failed communication session. The fallback indicators 116' that are included in the SIP request 114 may therefore correspond to the Fallback RATs 118, which, in the example of FIG. 1A, are supported by the UE 102. As shown in FIG. 1A, the SIP request 114 includes fallback indicator (FBI) 2, FBI 3, and FBI M. This may indicate to the receiving IMS node that the UE 102 is capable of using RAT 108(2) (corresponding to FBI 2), RAT 108(3) (corresponding to FBI 3), and RAT 108(M) (corresponding to FBI M) as Fallback RATs 118 in the event that there is an issue preventing a communication session from being established on the first RAT 108(1), which, again, may be a preferred RAT (e.g., a 5G RAT).

In some embodiments, the fallback indicators 116' included in the SIP request 114 may comprise feature tags, and these feature tags may be included in a header of the SIP request 114. For example, FBI 2 may be implemented as a "VoLTEFB" feature tag to indicate that the UE 102 is capable of reattempting communication sessions using a 4G RAT (e.g., VoLTE). Meanwhile, FBI 3 may be implemented as a "VoWiFiFB" feature tag to indicate that the UE 102 is also capable of reattempting communication sessions using a WiFi AP (e.g., WiFi calling). Lastly, FBI M may be implemented as a "CSFB" feature tag to indicate that the UE 102 is also capable of reattempting communication sessions using a 3G/2G RAT. These are merely examples of types of feature tags that can be used as fallback indicators 116' in the SIP request 114. Furthermore, in some embodiments, the fallback indicators 116' can be included elsewhere in the SIP request 114, such as in a Require header field of the SIP request 114, in a Supported header field of the SIP request 114, and the like.

It is to be appreciated that the timing of sending the SIP request 114 may vary. For instance, the SIP request 114 can be sent as a registration request (e.g., using the SIP REGISTER method) when the UE 102 is requesting registration for one or more IMS-based services. That is, before requesting establishment of a communication session, the UE 102 can request registration for one or more IMS-based services while the UE 102 is in idle mode, and the SIP request 114 may represent such a request that also includes the fallback indicators 116'.

Additionally, or alternatively, the SIP request 114 can be sent as a session request (e.g., using the SIP INVITE method) when the UE 102 is requesting to establish a communication session. That is, whenever the user 104 wants to establish a communication session (e.g., a voice call), the user 104 may provide user input to the UE 102 (e.g., by dialing a phone number of another user), which may result in the transmission of the SIP request 114 as a session request that includes the fallback indicators 116'. When the SIP request 114 is sent as a session request, fallback procedures can be determined for the UE 102 on a per-session (e.g., per-call) basis. By contrast, sending fallback indicators 116' during registration does not allow for determining fallback procedures on a per-session basis. Nevertheless, there may be reasons to send fallback indicators 116' at a time of registration. In some embodiments, the UE 102 may be configured to send fallback indicators 116' in both a registration request and a session request such that the SIP request 114 in FIG. 1A represents one or the other type of request. In this scenario, a SIP response 120 to a session request may override a previous SIP response to a registration request, or vice versa. Since a registration request is sent before a session request, a SIP response 120 to the session request may override an earlier-transmitted SIP response to an earlier-transmitted registration request, assuming there is an actual conflict between the SIP responses in terms of the Fallback RATs 118 that are authorized in each SIP response. If both SIP responses do not conflict with each other by virtue of the same set of Fallback RATs 118 being authorized in both SIP responses, then there may be no need to override one SIP response with the other.

In some embodiments, the SIP request 114 that includes the fallback indicator(s) 116' can be sent as a registration request (e.g., using the SIP REGISTER method), and this SIP request 114 can be followed by a subscription request (e.g., using the SIP SUBSCRIBE method) as part of a subscription registration event. For example, the UE 102 may send a SIP SUBSCRIBE request with the Event: 'reg' following a SIP REGISTER request that included the fallback indicator(s) 116'. In this scenario, an IMS node of the IMS core 112 may respond with a SIP response 120 that uses the SIP NOTIFY method, and includes information indicating which of the supported Fallback RATs 118 the UE 102 is authorized to use. For example, the SIP response 120 may be sent as a SIP NOTIFY response with the Event: 'reg', and including information, such as a set of authorized fallback indicators 116".

In any case, an IMS node of the IMS core 112 may receive the SIP request 114, may read or parse the fallback indicator(s) 116' included in the SIP request 114, and may respond by sending the SIP response 120. The SIP response 120 may include information indicating which of the supported Fallback RATs 118 the UE 102 is authorized to use. For example, the IMS node may authorize some, all, or none of the Fallback RATs 118 (corresponding to the fallback indicators 116') supported by the UE 102. In the example of FIG. 1A, the SIP response 120 is shown as including this information in the form of fallback indicators 116". Thus, the IMS node may be configured to indicate which Fallback RATs 118 are authorized by including the corresponding fallback indicators 116" for those authorized Fallback RATs 118 in the SIP response 120. In an implementation, the IMS node may be configured to omit a fallback indicator 116' from the SIP response 120 as a way of indicating that the corresponding Fallback RAT 118 is not authorized for use by the UE 102. For instance, any of the fallback indicators 116' in the SIP request 114 may be omitted from the set of fallback indicators 116" in the SIP response 120 to eliminate those Fallback RATs 118 that the UE 102 is not authorized to use. In the example of FIG. 1A, the SIP response 120 omits fallback indicator FBI 3 from the set of fallback indicators 116", where FBI 3 was included in the set of fallback indicators 116' in the SIP request 114. Accordingly, this omission can be interpreted by the UE 102 to mean that the network does not authorize the UE 102 to reattempt communication sessions using the RAT 108(3) (which corresponds to FBI 3) as a Fallback RAT 118. In an example, if the RAT 108(3) (not shown in FIG. 1A) represents a wireless AP that the UE 102 is configured to utilize for reattempting a voice-based communication session as a VoWiFi call, the IMS node may nevertheless indicate, by omitting the fallback indicator FBI 3 from the SIP response 120, that the UE 102 is not authorized to reattempt a failed 5G voice-based communication session as a VoWiFi call.

Although FIG. 1A illustrates that the IMS node can use an "inclusion/omission" technique to indicate which Fallback RATs 118 are authorized/not authorized, it is to be appreciated that the IMS node may utilize other techniques to respond with similar fallback information. For example, the SIP response 120—instead of omitting individual ones of the fallback indicators 116'—may include a set of fallback indicators 116" that is the same exact set of fallback indicators 116' included in the SIP request 114, along with corresponding answers (e.g., "yes" or "no", "authorized" or "not authorized", etc.) associated with each of the fallback indicators 116" in the SIP response 120. As with the SIP request 114, the fallback indicators 116" in the SIP response 120 may be implemented as feature tags, and the feature tags may be included in a header of the SIP response 120.

As will be described in more detail below, the IMS node may consider various criteria to determine which UE-supported Fallback RATs 118 to authorize, and which UE-supported Fallback RATs 118 not to authorize. In some embodiments, such as when the SIP request 114 represents a session request to establish a communication session, the criteria evaluated by the IMS node may cause the IMS node to respond differently to the same UE 102 on a per-session (e.g., per-call) basis. Example criteria will be described in more detail below with reference to the following figures.

Turning to FIG. 1B, the UE 102 is shown at a time when the UE 102 is reattempting to establish a communication session after a session failure during setup. In particular, after an initial attempt to establish a communication session using the RAT 108(1), which may be a preferred RAT (e.g., a 5G RAT), the UE 102 detects an issue that inhibits the communication session from being established using the RAT 108(1), which results in a failed communication session attempt 122. The issues causing the failed communication session attempt 122 can vary, and the UE 102 may receive a message from the network indicating the failure, and/or may try to send packets and fail to receive a response in a threshold amount of time, which may indicate to the UE 102 an inability to establish the communication session using the RAT 108(1). In an example, one or more network nodes supporting a 5G RAT system or the 5G core network may crash and redundancy mechanisms may fail, causing a widespread 5G outage. This is merely an example of an issue that can cause the failed communication session attempt 122, however, and other issues (e.g., coverage issues, etc.) may arise, which inhibit a communication session from being established over the RAT 108(1).

In response to the UE 102 determining that the communication session cannot be established using the RAT 108(1), the UE 102 may consult the information received earlier in SIP response 120 to determine which Fallback RATs 118 are authorized for reattempting to establish the failed communication session attempt 122 as a communication session reattempt 124. In the example of FIG. 1A, the SIP response 120 indicates (by the inclusion of FBI 2 and FBI M) that the RAT 108(2) and the RAT 108(M) are authorized for the UE 102 to reattempt the failed communication session 122 as a communication session reattempt 124. FIG. 1B shows that the UE 102 reattempts to establish the communication session using the RAT 108(M) based on the information included in the SIP response 120 (i.e., based on the inclusion of the FBI M) in the SIP response 120. When multiple Fallback RATs 118 are authorized in a SIP response 120 and are available to the UE 102 at a time when the communication session attempt using the RAT 108(1) fails, the UE 102 may implement a selection algorithm to select one of the multiple Fallback RATs 118 that are authorized for use in reattempting the communication session. In some embodiments, the UE 102 may use a selection algorithm that selects newer (more recent) RATs 108 over older (less recent) RATs 108, and/or the UE 102 may assess radio signal strength measurements to determine an optimal RAT 108, and so on. Notably, the UE 102, in response to the determining that the original communication session cannot be established using the RAT 108(1), may also refrain from trying to reattempt to establish the communication session using a RAT 108 that is not authorized in the SIP response 120. For example, the SIP response 120 in FIG. 1A omits FBI 3, and, based on this omission, the UE 102, in FIG. 1B, may refrain from trying to reattempt establishment of the communication session using the RAT 108(3) (corresponding to FBI 3), even in instances where the unauthorized RAT 108(3) is generally preferred by the UE 102 over individual ones of the authorized RATs 108. This conserves resources (e.g., UE resources and networking resources), as mentioned herein, by the UE 102 not wasting time and resources trying to fallback to RAT 108(3) when such an attempt may be futile (e.g., when the network does not have capacity to support UEs falling back to RAT 108(3), etc.).

Figure 2:
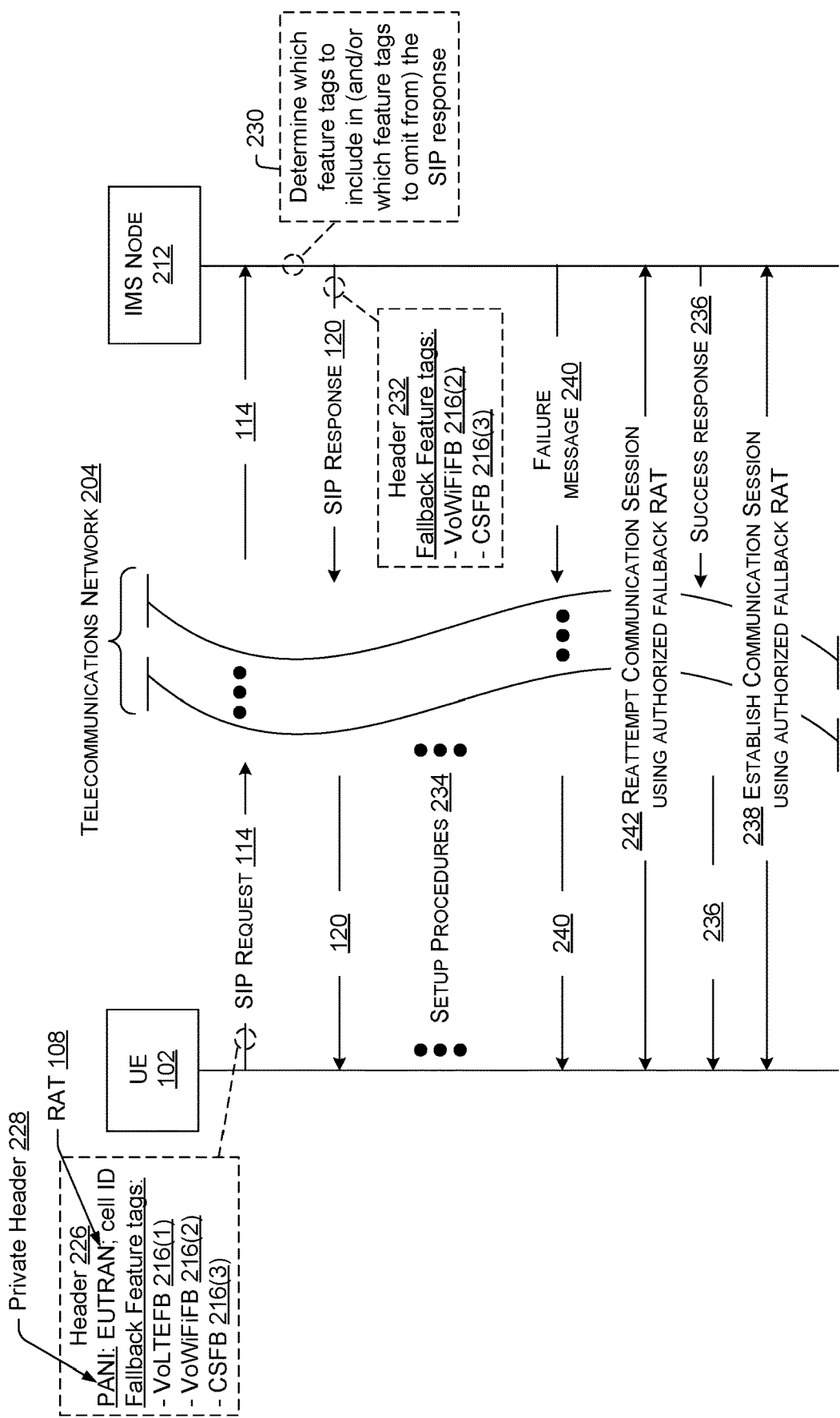
FIG. 2 is a diagram illustrating example signaling between a UE and an IMS node where fallback indicators are exchanged in SIP signaling.

FIG. 2 is a diagram illustrating example signaling between a UE 102 and an IMS node 212 where fallback indicators are exchanged in SIP signaling over a telecommunications network 204. As shown in FIG. 2, the UE 102 may send a SIP request 114 over the telecommunications network 204. The SIP request 114 may, in some embodiments, represent a registration request that uses the SIP REGISTER method to request registration for one or more IMS-based services (e.g., voice calling services). As such, the UE 102 may send the SIP request 114 in idle mode (e.g., when a user is carrying the UE 102 in his or her pocket and not currently engaged in a communication session). Additionally, or alternatively, the SIP request 114 may be sent as a session request that uses the SIP INVITE method to request establishment of the communication session. As an example, the UE 102 may, in response to receiving user input to request establishment of a communication session (e.g., a user 104 dialing a number, uttering a name of a contact, selecting a contact, etc.), attempt to establish a communication session by sending the SIP request 114 using the SIP INVITE method.

The SIP request 114 may include one or more fallback indicators (e.g., the fallback indicators 116' introduced in FIG. 1A). In FIG. 2, these fallback indicators are shown in the form of feature tags 216(1), 216(2), and 216(3). Although three feature tags 216(1)-(3) are included in the example SIP request 114 in FIG. 2, it is to be appreciated that any number of fallback indicators (e.g., feature tags 216) may be included in the SIP request 114, including a single feature tag 216 if the UE 102 supports a single Fallback RAT 118 and does not support any additional Fallback RATs 118. In any case, the SIP request 114 in FIG. 2 includes a first feature tag 216(1) (i.e., an example form of fallback indicator), a second feature tag 216(2), and a third feature tag 216(3), wherein each feature tag 216 is different from the others to indicate a specific Fallback RAT 118 that is supported by the UE 102. In this example, the UE 102 may be a 5G-compliant UE that supports a 4G LTE RAT 108 corresponding to the first feature tag 216(1) ("VoLTEFB" feature tag). The 5G-compliant UE 102 may also support a WiFi (or non-3GPP) RAT 108 corresponding to the second feature tag 216(2) ("VoWiFiFB" feature tag), as well as a circuit-switched RAT 108 corresponding to the third feature tag 216(3) ("CSFB" feature tag). The feature tags may be included in a header 226 of the SIP request 114.

The SIP request 114 may further include a private header 228 (e.g., a Private-Access-Network-Info (PANI) header) that specifies a particular RAT 108 that is available to the UE 102 for establishing a communication session, among other information that may be included in the private header 228. In this example, EUTRAN (which stands for "evolved universal terrestrial radio access network") may correspond to a 4G LTE RAT. In an example, the SIP request 114 may represent a session request (using the SIP INVITE method) to establish a communication session (e.g., a voice call) using a 4G LTE RAT, as indicated by the RAT 108 specified in the private header 228; in this case, "EUTRAN" is specified in the private header 228, which can be interpreted as a 4G LTE RAT, and the UE 102 is, therefore, attempting to establish a communication session using the 4G LTE RAT indicated in the private header 228 of the SIP request 114. This may be because a preferred RAT 108(1) is unavailable to the UE 102 at the time the SIP request 114 is sent, and the best available RAT 108 may be the RAT 108 specified in the private header 228.

Ultimately, the SIP request 114 can be received by the IMS node 212. The IMS node 212 may read or parse the feature tags 216(1)-(3) (feature tag being a form of fallback indicator), and, at 230, the IMS node 212 may determine which of the feature tags 216(1)-(3) to include in, and/or which of the feature tags 216(1)-(3) to omit from, a SIP response 120. As mentioned, the IMS node 212 may consider (or evaluate) various criteria to make the determination at 230. One example criterion that can be evaluated to make the determination at 230 is whether the SIP request 114 is a session request associated with an emergency short code (e.g., 911 in the United States) dialed by the user of the UE 102. In this scenario, if the SIP request 114 is a session request that is associated with an emergency short code to establish a communication session with a public safety answering point (PSAP), the IMS node 212 may determine to omit one or more of the feature tags 216 from the SIP response 120 in an effort to help connect the user to a nearest PSAP, which may facilitate providing emergency services to the user's location quicker. In this scenario, the determination at 230 may also evaluate a profile of the calling party to determine if he/she is a roaming subscriber or a home subscriber. Consider a scenario where two carriers negotiate a roaming contract that stipulates roaming subscribers who make VoWiFi calls on a roaming network are to be routed to their home network. As such, a roaming UE 102 that makes an emergency call (e.g., 911 in the United States) over a WiFi RAT (i.e., VoWiFi) may be routed to a PSAP in their home network, which may be far away (geographically) from an actual location of the user. For instance, a roaming user from Japan may make a VoWiFi call to 911 while in the United States, and while roaming on a United States carrier's network, and, pursuant to a roaming contract, may be routed to a PSAP in Japan instead of a PSAP in the United States. In this scenario, the IMS node 212 in FIG. 2 may determine, at 230, that the incoming session request is an emergency VoLTE call, and based on the user of the UE 102 being a roaming subscriber, the IMS node 212 may omit the "VoWiFiFB" feature tag 216(2) from the SIP response 120 to ensure that the UE 102 does not fallback to a WiFi RAT 108 to try and establish an emergency call, so as to avoid routing the user to a geographically disparate PSAP.

Another example criterion that can be evaluated to make the determination at 230 is whether any of the feature tags 216 in the SIP request 114 correspond to a type of RAT 108 that is the same as the RAT 108 specified in the private header 228 of the SIP request 114. In the example of FIG. 2, the RAT 108 specified as "EUTRAN" in the private header 228 of the SIP request 114 is a 4G LTE RAT, and the first feature tag 216(1) also corresponds to a 4G LTE RAT. As such, the determination at 230 may be to omit the first feature tag 216(1) from the SIP response 120 based on the notion that if the UE 102 fails to establish a communication session on a 4G LTE RAT, it may be a waste of time and resources to reattempt to establish the communication session on the 4G LTE RAT. This scenario may occur when a preferred RAT 108(1) (e.g., a 5G RAT) is unavailable to the UE 102, such that when the UE 102 specifies that it has a capability to fallback to a 4G LTE RAT, the IMS node 212 may determine to not authorize a fallback to the same 4G LTE RAT in the event that a communication session cannot be established on the 4G LTE RAT.

Yet another example criterion that can be evaluated to make the determination at 230 is whether a current network capacity metric indicates that a capacity of the telecommunications network 204 is insufficient to handle network traffic from UEs using individual ones of the UE-supported Fallback RATs 118. For instance, the IMS node 212 may be configured to measure a current network capacity metric based on data available to the IMS node 212 in regards to numbers of UEs using the telecommunications network 204 (perhaps broken down by geographical region, etc.), and may evaluate whether the capacity metric is at a level (e.g., above a threshold) to indicate that the network will be unduly stressed in the event of a widespread outage were UEs allowed to fallback to a particular Fallback RAT. Consider a case where the feature tag 216(1) corresponds to such a Fallback RAT 118. In this case, the IMS node 212 may omit the feature tag 216(1) from the SIP response 120 based on the current network capacity metric in order to provide time for the network to recover in the event of a widespread outage on a different (e.g., preferred) RAT 108(1).

Yet another example criterion that can be evaluated to make the determination at 230 is whether any of the Fallback RATs corresponding to the feature tags 216(1)-(3) in the SIP request 114 represent circuit-switched RATs that employ circuit-switching for voice communications, and, if so, whether the UE 102 has performed a combined attach procedure to register on both the circuit-switched network and a packet-switched network (e.g., 4G LTE). For instance, the "CSFB" feature tag 216(3) may correspond to a circuit-switched Fallback RAT, and the IMS node 212 may determine this at 230, and may determine that the UE 102 has not performed a combined attach procedure and is, therefore, not registered on a circuit-switched network. In this scenario, the IMS node 212 may determine to omit the CSFB feature tag 216(3) from the SIP response 120 so as to avoid having the UE 102 reattempt to establish a communication session on a circuit-switched Fallback RAT when one may not be available to the UE 102.

In any event, the IMS node 212 determines which of the feature tags 216(1)-(3) to include in (if any), and/or which of the feature tags 216(1)-(3) to omit from (if any), the SIP response 120, and may send the SIP response 120 over the telecommunications network 204. Here, the inclusion of the feature tags 216(2) and 216(3) in the SIP response 120 indicates that the UE is authorized to reattempt communication sessions using a RAT 108(2) corresponding to the feature tag 216(2) and is authorized to reattempt communication sessions using a RAT 108(3) corresponding to the feature tag 216(3). Meanwhile, the omission of the feature tag 216(1) from the SIP response 120 indicates that the UE is not authorized to reattempt communication sessions using a RAT 108(1) corresponding to the feature tag 216(1). Thus, the UE 102 will refrain from trying to reattempt establishment of a failed communication session using the RAT 108(1) corresponding to the omitted feature tag 216(1).

The UE 102 may receive the SIP response 120 over the telecommunications network 204. The UE 102 may then perform setup procedures 234 to setup the communication session. If a preferred RAT (e.g., a 5G RAT) is available, the preferred RAT may be used in the attempt to establish the communication session. If such a preferred RAT is not available, a next best RAT may be used to attempt establishment of the communication session. These setup procedures 234 may represent any type of setup procedures, in any suitable number, that may be performed to setup and establish the communication session. Some examples of the setup procedures 234 include, without limitation, sending/receiving a session request (e.g., a SIP INVITE message), sending/receiving a session progress message (sometimes called a "183 response"), establishing a radio resource control (RRC) connection with a particular RAT 108, establishing a dedicated bearer (e.g., a dedicated evolved packet system (EPS) bearer), sending/receiving a 100 Trying message (indicating a session request has been received at a terminating device), sending/receiving a 180 Ringing message (indicating that a terminating party of the terminating device is being alerted), sending/receiving an UPDATE message, sending/receiving various "ACK" messages (e.g., a PRACK message), and so on. A person having ordinary skill in the art will readily recognize that the setup procedures 234 are not limited to the examples described herein, and that other (e.g., different and/or additional) setup procedures may be performed in order to setup the communication session over a telecommunication network 204. Furthermore, some of the example setup procedures described herein may be omitted or unnecessary for setting up a communication session.

At some point during the communication session setup, an issue may arise that inhibits the communication session from being established using the best available RAT. This can be determined by the UE 102 in various ways in order to trigger the initiation of a fallback procedure to reattempt to establish the communication session. In some embodiments, the UE 102 may not receive an expected response (e.g., a final 2xx-6xx response) from the network after a threshold period of time (e.g., a timeout, such as a call setup timer timeout), and may deduce that the communication session cannot be established using the RAT the UE 102 was attempting to use. In other embodiments, the UE 102 may receive a failure message 240 from the network (e.g., from the IMS node 212). This failure message 240 may be sent as an additional SIP response using SIP protocol, or a response using Non-access Stratum (NAS) signaling, etc. In some embodiments, the failure message 240 includes a code that is to be interpreted by the UE 102 as an instruction to implement a fallback procedure. As such, omission of this code (or the inclusion of a different code in lieu of this code) may be interpreted by the UE 102 as an instruction to refrain from implementing a fallback procedure altogether. In this manner, the network may have the ability to dynamically determine whether a UE 102 is to implement a fallback procedure or not, and if the code is included in the failure message 240, instructing the UE 102 to implement a fallback procedure, the UE 102 reattempts to establish the communication session using an authorized Fallback RAT 118 according to the information in the SIP response 120.

It is to be appreciated that, in the scenario where fallback indicators 116 are exchanged during registration, the session failure can occur even before a session request is sent by the UE 102, such as before a SIP INVITE. For instance, a session setup may fail at the RRC re-establishment phase between the UE 102 and a RAN component (e.g., eNB), or the session setup may fail during an attempt to re-establish NAS signaling at the IMS Packet Data Network (PDN) layer between the UE 102 and a mobility management entity (MME).

Regardless of whether or not the failure message 240 with a code is utilized, the UE 102 may be configured to reattempt to establish the communication session using an authorized Fallback RAT at 242. In the example of FIG. 2, the UE 102 may select one of the Fallback RATs corresponding to the feature tags 216(2) or 216(3) in the SIP response 120. As mentioned, a selection algorithm (e.g., selecting a next best RAT) can be utilized when multiple Fallback RATs are authorized in the SIP response 120.

Assuming a successful reattempt, a final success response 236 (e.g., SIP 200 (OK)) may be received by the UE 102 in order to establish the communication session at 238, in this case using the authorized Fallback RAT selected by the UE 102. It is to be appreciated that, in the event that there is an issue with setting up the communication session using the Fallback RAT, other types of final responses may be transmitted to resolve the session setup on the reattempt, such as a 4xx—client failure, a 5xx—server failure, or a 6xx—global failure. The communication session setup is not complete unless and until the UE 102 receives a final response (e.g., a success response 236, a 4xx response, a 5xx response, a 6xx response, etc.). Furthermore, the communication session is not established at 238 unless and until the UE 102 receives a final response in the form of a success response 236 (e.g., SIP 200 (OK)).

It is to be appreciated that the arrangement of the signaling in FIG. 2 is not necessarily meant to depict a particular order of the signaling that is to take place. With this in mind, any given signal shown in FIG. 2 may occur before, during, or after any of the other specific signaling that is shown in FIG. 2.

It is also to be appreciated that, although a reattempt scenario is depicted in FIG. 2, and elsewhere in this disclosure, the techniques and systems described herein may additionally, or alternatively, be utilized to resume an ongoing communication session that has failed after an initial establishment. For example, the UE 102 may be configured to resume a failed communication session (e.g., using an automatic redial) with an authorized RAT. Thus, session continuity can be preserved through the exchange of fallback indicators in SIP signaling.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
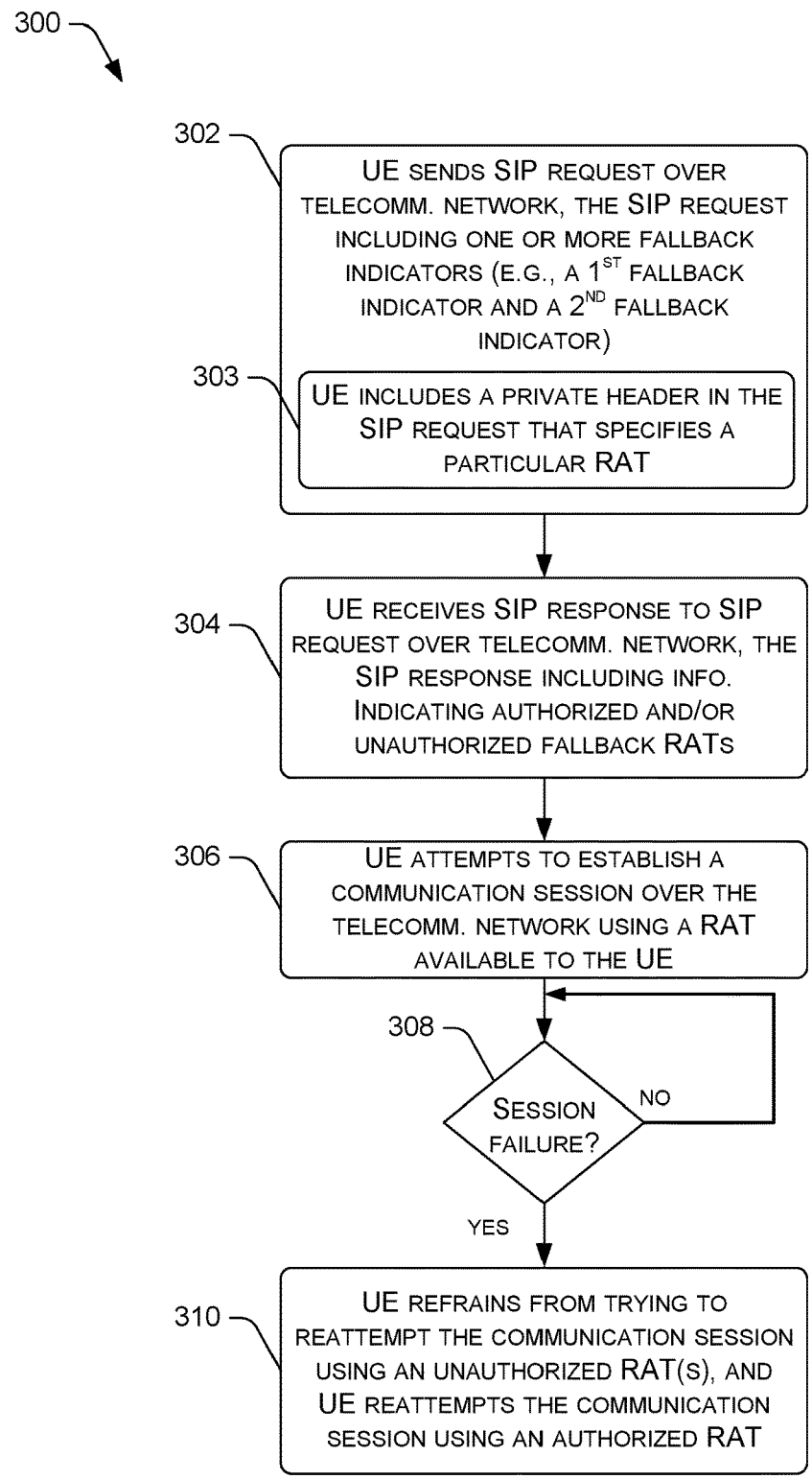
FIG. 3 illustrates a flowchart of an example process implemented by a UE to exchange fallback indicators with an IMS node in SIP signaling.

FIG. 3 illustrates a flowchart of an example process 300 implemented by a UE 102 to exchange fallback indicators with an IMS node 212 in SIP signaling. The process 300 is described, by way of example, with reference to the previous figures.

At 302, a UE 102 may send, over a telecommunications network 204, a SIP request 114, the SIP request 114 including one or more fallback indicators 116'. In an example, the SIP request 114 may include a first fallback indicator 116'(1) and a second fallback indicator 116'(2) that is different from the first fallback indicator 116'(1), and perhaps one or more additional fallback indicators 116'. These fallback indicators 116' may indicate the UE's 102 capabilities in terms of the RATs 108 supported by the UE 102 for implementing fallback procedures in the event of a communication session failure. In some implementations, the fallback indicators 116' may be in the form of feature tags 216, the feature tags included in a header 226 of the SIP request 114. Moreover, the SIP request 114 sent at block 302 may represent a registration request or a session request.

At sub-block 303, in some embodiments the UE 102 may optionally include a private header 228 (e.g., a PANI header) that specifies a particular RAT 108 that is available to the UE 102 to establish a communication session. If the SIP request 114 transmitted at block 302 represents a session request (e.g., using the SIP INVITE method), the UE 102 may be presently attempting to establish a communication session using the particular RAT 108. The RAT 108 specified in the private header 228 may be utilized by a receiving IMS node 212 to determine which UE-supported Fallback RATs to authorize or not authorize, as described herein.

At 304, the UE 102 may receive, over the telecommunications network 204, a SIP response 120 to the SIP request 114. The SIP response 120 may include information indicating whether the UE is authorized or not authorized to reattempt communication sessions using particular Fallback RATs 118 corresponding to individual ones of the fallback indicators 116' included in the SIP request 114. For example, if the SIP request 114 sent at block 302 includes a first fallback indicator 116'(1) and a second fallback indicator 116'(2), the SIP response 120 may include information indicating that the UE 102 is (i) not authorized to reattempt communication sessions using a first RAT 108(1) corresponding to the first fallback indicator 116'(1), and (ii) authorized to reattempt communication sessions using a second RAT 108(2) corresponding to the second fallback indicator 116'(2). This information may indicate as much by including a set of fallback indicators 116" in the SIP response 120 that omits the first fallback indicator 116'(1) and includes the second fallback indicator 116'(2), which were both included in the SIP request 114, or the SIP response 120 may provide answers (e.g., "yes" or "no", "authorized" or "not authorized") next to all of the UE-supported fallback indicators 116".

At 306, the UE 102 may attempt to establish a communication session over the telecommunications network 204 using a RAT 108 that is available to the UE 102 at a time of the attempting at block 306. This may be the best available RAT 108 for that UE at the UE's 102 current geographic location. In some embodiments, this represents a preferred RAT 108(1) (e.g., a 5G RAT). In some embodiments, the RAT 108 used in the attempt to establish the communication session at block 306 may be the same RAT as the RAT 108 that is specified in the private header 228 of the SIP request 114.

At 308, the UE 102 may determine whether there has been a session failure in the sense that the communication session cannot be established using the existing RAT 108 (i.e., the RAT 108 that was used to attempt establishment of the communication session at block 306). As mentioned, the UE 102 can make this determination in various ways (e.g., a timeout without receiving an expected response from the network, receiving a particular error message from the network, etc.).

If, at block 308, the UE 102 determines that there has been no session failure, the process 300 may continue to monitor the session status by following the "no" route from block 308 to iterate the determination at block 308. If and when an issue arises that inhibits the communication session from being established using the existing RAT 108 (and the UE 102 detects this session failure at block 308), the process 300 may follow the "yes" route from block 308 to block 310. In some embodiments, the UE 102, at block 308, may determine that the communication session cannot be established using the existing RAT 108 based on receiving an additional SIP response over the telecommunications network 204, such as a failure message 240 that includes a code (e.g., a predefined code) that is interpreted by the UE 102 as an instruction to reattempt the failed communication session using an authorized Fallback RAT 118.

At 310, the UE 102 may reattempt to establish the communication session using an authorized RAT indicated in the SIP response 120 the UE 102 received at block 304. In the running example, if the information in the SIP response 120 indicates (e.g., by inclusion of the second fallback indicator 116'(2)) that a second UE-supported RAT 108(2) is authorized for use in reattempting establishment of communication sessions, the UE 102 may reattempt to establish the communication session using this authorized RAT 108(2). In addition, the UE 102 may also refrain from trying to reattempt establishment of the communication session using an unauthorized RAT(s) indicated in the SIP response 120 the UE 102 received at block 304. In the running example, if the information in the SIP response 120 indicates (e.g., by omission of the first fallback indicator 116'(1)) that a first UE-supported RAT 108(1) is not authorized for use in reattempting communication sessions, the UE 102 may, at block 310, refrain from trying to reattempt establishment of the communication session using this unauthorized RAT 108(1).

Consider an example where the SIP response 120 indicates that a RAT 108(2)—corresponding to a RAT usable by the UE 102 to reattempt communication sessions as VoLTE calls—is authorized. In this scenario, the UE 102, at block 310, may reattempt to establish the communication session by falling back to a VoLTE call after failing to establish a voice call over 5G. The SIP response 120 may also indicate that a RAT 108(1)—corresponding to a RAT usable (i.e., supported) by the UE 102 to reattempt communication sessions as VoWiFi calls—is not authorized. In this scenario, the UE 102, at block 310, may refrain from trying to fallback to a VoWiFi call. Accordingly, the network's determination to preclude the UE 102 from attempting to fallback to a VoWiFi call may conserve resources because the network can determine that it may be futile for the UE 102 to attempt a fallback to a VoWiFi call.

Figure 4:
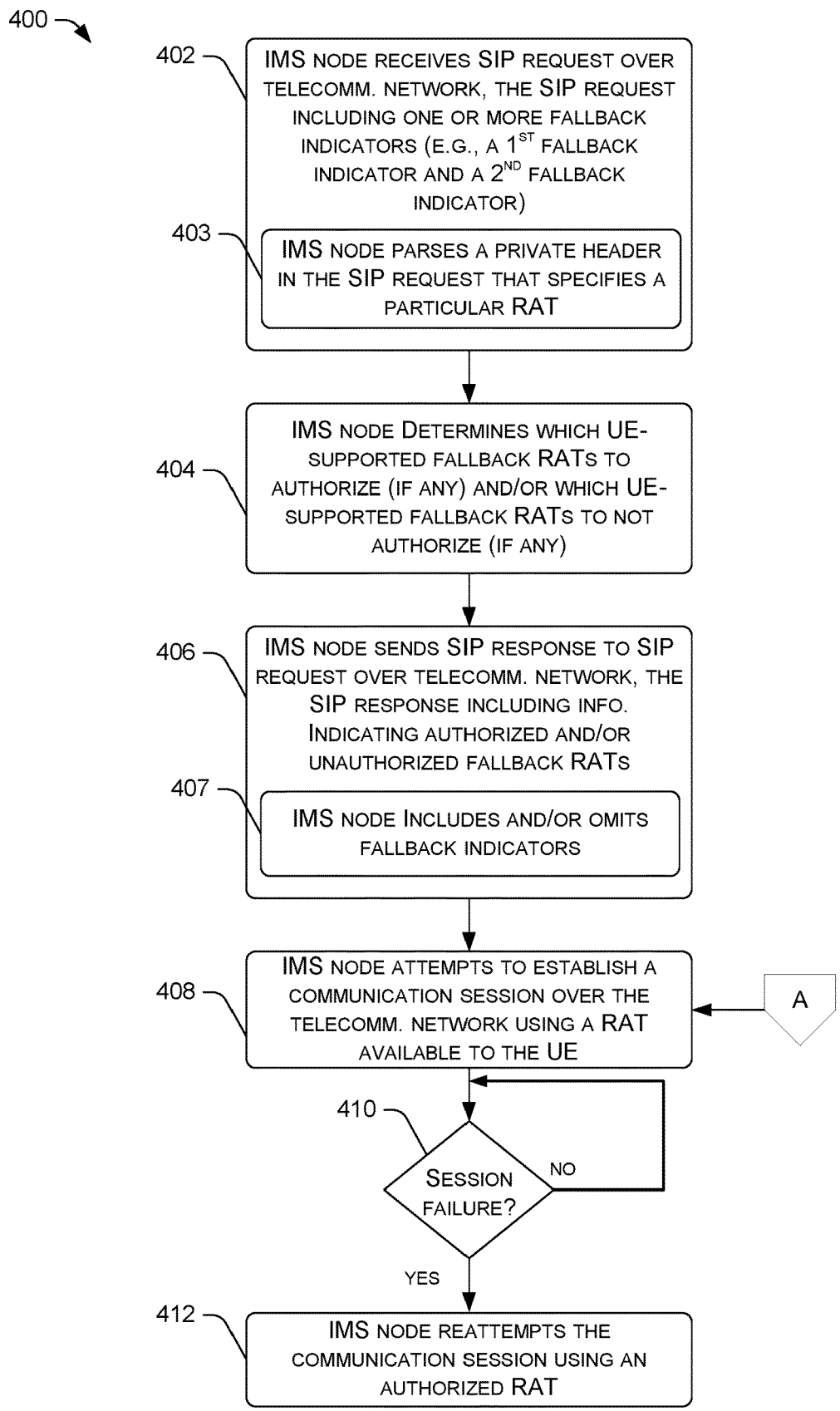
FIG. 4 illustrates a flowchart of an example process implemented by an IMS node to exchange fallback indicators with a UE in SIP signaling.

FIG. 4 illustrates a flowchart of an example process 400 implemented by an IMS node 212 to exchange fallback indicators with a UE 102 in SIP signaling. The process 400 is described, by way of example, with reference to the previous figures.

At 402, an IMS node 212 may receive, over a telecommunications network 204, a SIP request 114 from a UE 102. The SIP request 114 may include one or more fallback indicators 116' indicating the capabilities of the UE 102 in terms of the Fallback RATs 118 the UE 102 supports. For example, the fallback indicators 116' included in the SIP request 114 may include a first fallback indicator 116'(1) and a second fallback indicator 116'(2) that is different from the first fallback indicator 116'(1). The fallback indicators 116' may comprise feature tags 216, and may be included in a header 226 of the SIP request 114. The SIP request 114 may further include a private header 228 that specifies a particular RAT 108. This RAT 108 may represent a RAT that the UE 102 is using while trying to establish a communication session (e.g., when the SIP request 114 is a session request).

As shown in sub-block 403, in some embodiments the IMS node 212 may read or parse the optional private header 228 to identify the RAT 108 specified in the private header 228.

At 404, the IMS node 212 may determine which of the UE-supported Fallback RATs 118 (as indicated by the fallback indicators 116' in the SIP request 114) to authorize (if any), and which of the UE-supported Fallback RATs 118 not to authorize (if any). Various criteria may be evaluated at block 404 to make this determination.

At 406, the IMS node 212 may send, over the telecommunications network 204, a SIP response 120 to the SIP request 114, the SIP response including information indicating which of the UE-supported Fallback RATs 118 (as indicated by the fallback indicators 116' in the SIP request 114) the UE is authorized and/or not authorized to utilize in reattempting to establish a communication session.

As indicated by sub-block 407, in some embodiments the IMS node 212 may include optional fallback indicators 116" in the SIP response 120 to indicate which of the UE-supported Fallback RATs 118 are authorized for reattempting communication sessions. Additionally, or alternatively, the IMS node 212 may omit fallback indicators from the SIP response 120 to indicate which of the UE-supported Fallback RATs 118 are not authorized for reattempting communication sessions. As described herein, these fallback indicators 116" may be in the form of feature tags 216, and the feature tags 216 may be included in a header 232 of the SIP response 120. In some embodiments, the information in the SIP response 120 may include answers (e.g., "yes" or "no"; "authorized" or "not authorized", etc.) for each of the fallback indicators 116' that were included in the SIP request 114.

At 408, the IMS node 212 may attempt to establish a communication session for the UE 102 over the telecommunications network 204 using a particular RAT 108 that is available to the UE 102 at a time of the attempting at block 408.

At 410, the IMS node 212 may monitor for a session failure, and so long as no session failure occurs, the process 400 may follow the "no" route from block 410 to continue monitoring the session status (i.e., iterating block 410). If and when a session failure occurs (e.g., an issue arises inhibiting the communication session from being established using the existing RAT 108), the process 400 may follow the "yes" route from block 410 to block 412.

At 412, the IMS node 212 may reattempt to establish the communication session for the UE 102 using a RAT authorized in the SIP response 120 sent at block 406.

Figure 5:
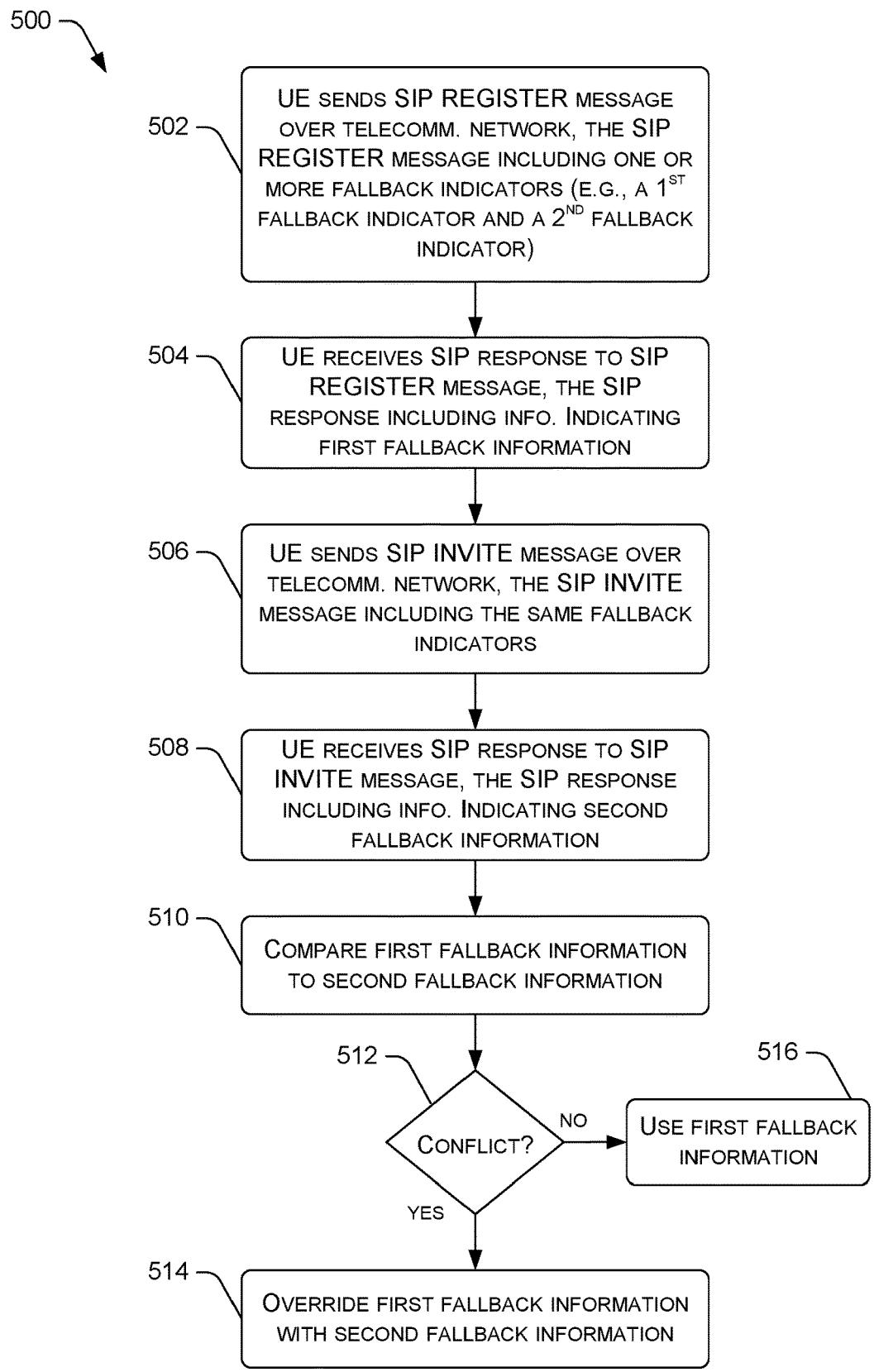
FIG. 5 illustrates a flowchart of an example process implemented by a UE to resolve conflicting fallback information received from an IMS node.

FIG. 5 illustrates a flowchart of an example process 500 implemented by a UE 102 to resolve conflicting fallback information received from an IMS node 212. The process 500 is described, by way of example, with reference to the previous figures.

At 502, a UE 102 may send, over a telecommunications network 204, a SIP request 114 as a registration request using the SIP REGISTER method. The SIP request 114 sent as a registration request may include one or more fallback indicators 116'. In an example, the SIP request 114 sent as a registration request may include a first fallback indicator 116'(1) and a second fallback indicator 116'(2) that is different from the first fallback indicator 116'(1), and perhaps one or more additional fallback indicators 116'. These fallback indicators 116' may indicate the UE's 102 capabilities in terms of the RATs 108 supported by the UE 102 for implementing fallback procedures in the event of a communication session failure. In some implementations, the fallback indicators 116' may be in the form of feature tags 216, the feature tags included in a header 226 of the SIP request 114.

At 504, the UE 102 may receive, over the telecommunications network 204, a SIP response 120 to the SIP request 114 that was sent as a registration request, the SIP response 120 including first fallback information indicating whether the UE is authorized or not authorized to reattempt communication sessions using particular Fallback RATs 118 corresponding to individual ones of the fallback indicators 116' included in the SIP request 114 that was sent as a registration request. For example, if the SIP request 114 sent as a registration request at block 502 includes a first fallback indicator 116'(1) and a second fallback indicator 116'(2), the SIP response 120 may include information indicating that the UE 102 is (i) not authorized to reattempt communication sessions using a first RAT 108(1) corresponding to the first fallback indicator 116'(1), and (ii) authorized to reattempt communication sessions using a second RAT 108(2) corresponding to the second fallback indicator 116'(2). This information may indicate as much by including a set of fallback indicators 116" in the SIP response 120 that omits the first fallback indicator 116'(1) and includes the second fallback indicator 116'(2), which were both included in the SIP request 114 that was sent as a registration request, or the SIP response 120 may provide answers (e.g., "yes" or "no", "authorized" or "not authorized") next to all of the UE-supported fallback indicators 116'.

At 506, the UE 102 may send, over a telecommunications network 204, a SIP request 114 as a session request using the SIP INVITE method. The SIP request 114 sent as a session request may include the same fallback indicators 116' that were included in the SIP request 114 sent as a registration request at block 502.

At 508, the UE 102 may receive, over the telecommunications network 204, a SIP response 120 to the SIP request 114 that was sent as a session request, the SIP response 120 including second fallback information indicating whether the UE is authorized or not authorized to reattempt communication sessions using particular Fallback RATs 118 corresponding to individual ones of the fallback indicators 116' included in the SIP request 114 that was sent as a session request.

At 510, the UE 102 may compare the first fallback information received at block 504 to the second fallback information received at block 508. For example, if the respective SIP responses received at those blocks include fallback information in the form of a set of one or more fallback indicators 116", the UE 102 may compare the respective sets of fallback indicators 116" received during the registration stage and session stage. As another example, if the respective SIP responses received at blocks 504 and 508 include fallback information in the form of "yes/no" indicators associated with the fallback indicators 116' sent in the respective SIP requests, the UE 102 may compare the respective sets of "yes/no" indicators received during the registration stage and the session stage.

At 512, and based on the comparison of the fallback information at block 510, the UE 102 may determine if the compared fallback information conflicts (e.g., if one set of fallback indicators includes a fallback indicator that is omitted from the other set, or vice versa).

If, at block 512, a conflict is detected, the process 500 may follow the "yes" route from block 512 to block 514 where the UE 102 may override the first fallback information with the second fallback information. That is, the fallback information received in response to the session request may be used for fallback purposes in lieu of previously-received fallback information received in response to the registration request. It is to be appreciated that the UE 102, at block 514, may override the second fallback information with the first fallback information. That is, the fallback information received in response to the registration request may be used for fallback purposes in lieu of subsequently-received fallback information received in response to the session request. The overriding operation at block 514 may result in the UE 102 changing its behavior in the event that a communication failure is experienced using an existing RAT. For example, the overriding at block 514 may result in the UE 102 falling back to a different Fallback RAT 118 as compared to the Fallback RAT 118 that would have been utilized had the first fallback information been relied upon.

If, at block 512, a conflict is not detected based on the comparison at block 510 (e.g., both SIP responses included the same set of fallback indicators 116", or both SIP responses included the same answers for all of the UE-supported fallback indicators, etc.), the process 500 may follow the "no" route from block 512 to block 516, where the UE 102 may use the first fallback information received at block 504 (e.g., by discarding the second fallback information received at block 508 upon detecting that it is the same as the first fallback information) In an example where the same set of fallback indicators 116" are included in both SIP responses, the UE 102 may use the first set of fallback indicators 116" received at block 504 (e.g., by discarding the second set of fallback indicators 116" received at block 508).

Figure 6:
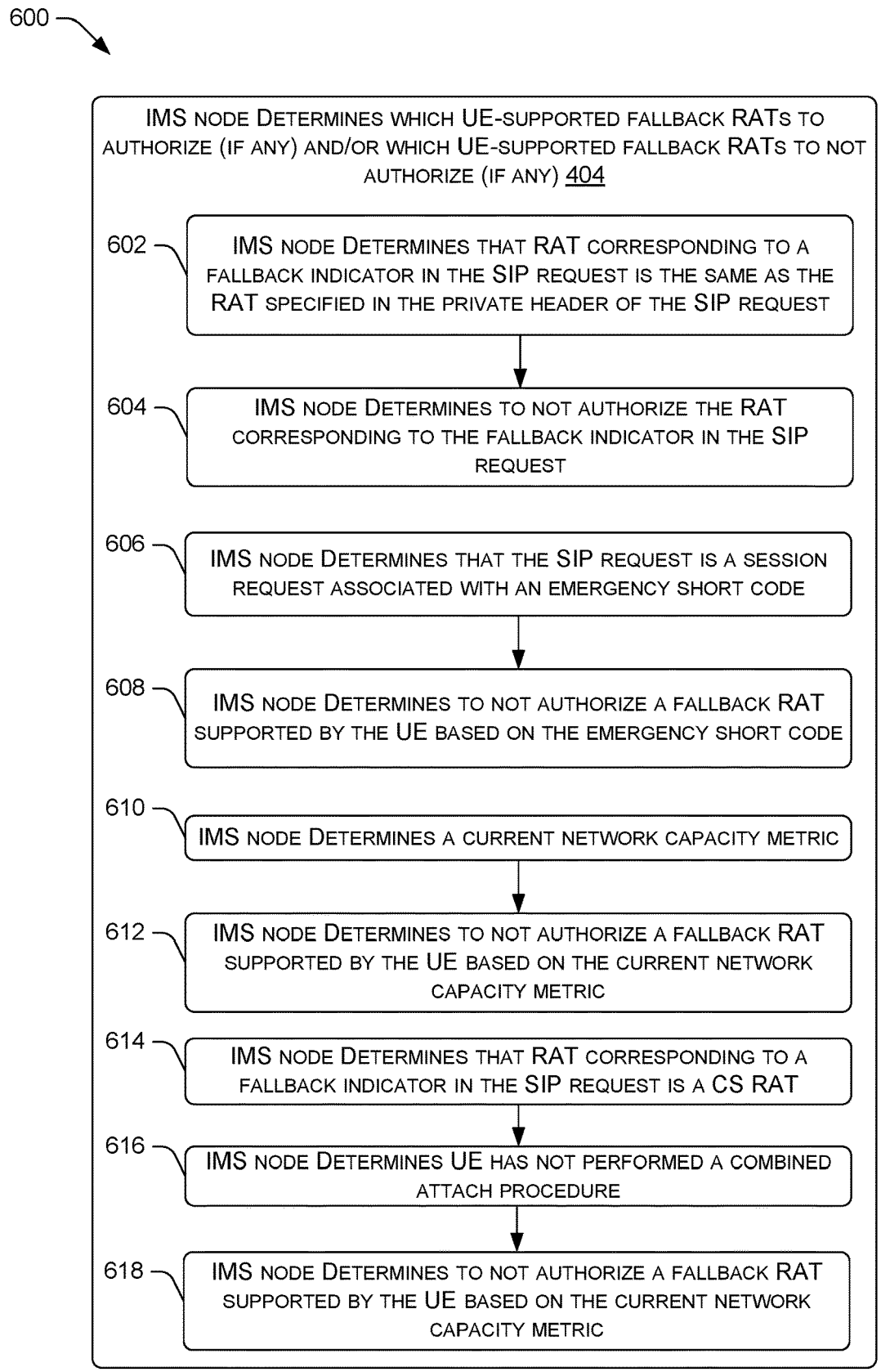
FIG. 6 illustrates a flowchart of an example process implemented by an IMS node to determine which UE-supported Fallback RATs to authorize and/or not authorize.

FIG. 6 illustrates a flowchart of an example process 600 implemented by an IMS node 212 to determine which UE-supported Fallback RATs to authorize and/or not authorize. The process 600 is described by way of example with reference to the previous figures. Furthermore, as indicated in FIG. 6, the process 600 may represent sub-operations that are performed at block 404 of the process 400 of FIG. 4, which assumes that the IMS node 212 is already in receipt of a SIP request 114 from a UE 102, the SIP request 114 including one or more fallback indicators 116'.

At 602, the IMS node 212 may determine that a Fallback RAT 118 corresponding to a fallback indicator 116' in the received SIP request 114 is the same as the RAT 108 specified in a private header 228 of the SIP request 114. This indicates that the UE 204 is informing the IMS node 212 that it is capable of falling back to the same RAT it is using to establish the communication session.

At 604, in response to determining that the Fallback RAT 118 corresponding to the fallback indicator 116' in the SIP request 114 matches the RAT 108 in the private header 228, the IMS node 212 may determine to not authorize the Fallback RAT 118 corresponding to the fallback indicator 116'. To do this, the IMS node 212 may, at block 604, determine to omit the fallback indicator 116' from the set of fallback indicators 116" in the SIP response 120.

At 606, the IMS node 212 may determine that the received SIP request 114 is a session request (e.g., using the SIP INVITE method) that is associated with an emergency short code (e.g., 911 in the United States) to establish the communication session with a PSAP.

At 608, the IMS node 212 may determine to not authorize a Fallback RAT 118 corresponding to one of the fallback indicators 116' included in the SIP request 114 because the session request being associated with the emergency short code. To do this, the IMS node 212 may, at block 608, determine to omit a fallback indicator 116' from the set of fallback indicators 116" in the SIP response 120 based at least in part on the session request being associated with the emergency short code.

At 610, the IMS node 212 may determine a current network capacity metric that indicates a capacity of the telecommunications network 204 to handle network traffic from UEs using a one of the Fallback RATs 118 corresponding to a fallback indicator 116' included in the SIP request 114.

At 612, the IMS node 212 may determine to not authorize a Fallback RAT 118 corresponding to one of the fallback indicators 116' included in the SIP request 114 based at least in part on the current network capacity metric (e.g., based on the current network capacity metric meeting or exceeding a threshold value). To do this, the IMS node 212 may, at block 612, determine to omit a fallback indicator 116' from the set of fallback indicators 116" in the SIP response 120 based at least in part on the current network capacity metric.

At 614, the IMS node 212 may determine that a Fallback RAT 118 corresponding to a fallback indicator 116' in the received SIP request 114 represents a RAT 108 usable by the UE 102 to reattempt communication sessions on a circuit-switched network (i.e., a CS Fallback RAT 118).

At 616, the IMS node 212 may determine that the UE 102 has not performed a combined attach procedure and is, therefore, not registered on a circuit-switched network.

At 618, the IMS node 212 may determine to not authorize the CS Fallback RAT 118 based at least in part on the UE 102 not having performed a combined attach procedure to register on both a circuit-switched network and a packet-switched network. To do this, the IMS node 212 may, at block 618, determine to omit the fallback indicator 116' corresponding to the CS Fallback RAT 118 from the set of fallback indicators 116" in the SIP response 120 based at least in part on the UE 102 not having performed a combined attach procedure to register on both a circuit-switched network and a packet-switched network.

Figure 7:
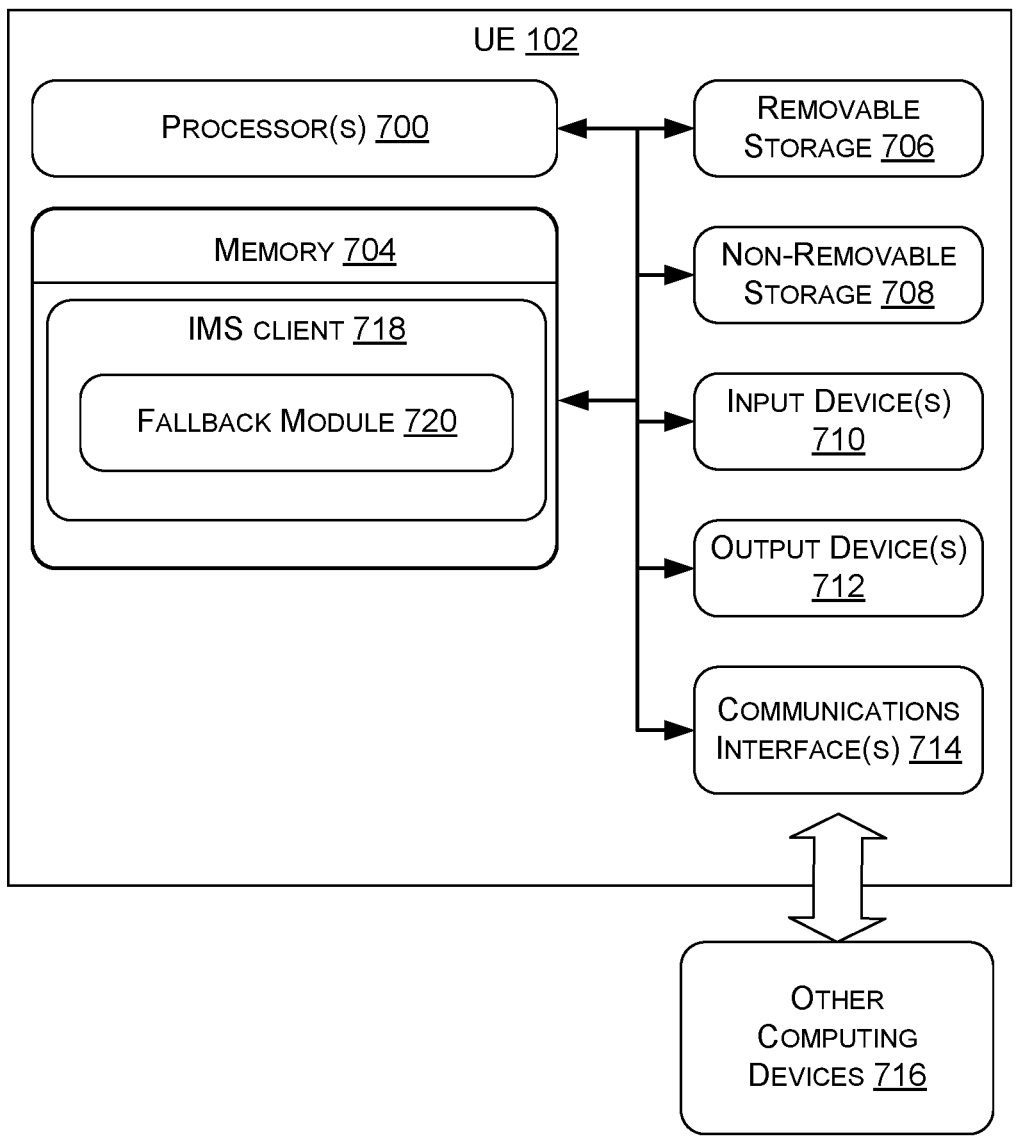
FIG. 7 is a block diagram of an example UE configured to exchange fallback indicators in SIP signaling.

FIG. 7 is a block diagram of an example UE 102 configured to exchange fallback indicators in SIP signaling.

As shown, the UE 102 may include one or more processors 700 and one or more forms of computer-readable memory 704. The UE 102 may also include additional storage devices. Such additional storage may include removable storage 706 and/or non-removable storage 708.

The UE 102 may further include input device(s) 710 and output device(s) 712 (e.g., a display(s), speaker(s), etc.) communicatively coupled to the processor(s) 700 and the computer-readable memory 704. The UE 102 may further include communications interface(s) 714 that allow the UE 102 to communicate with other computing devices 716 (e.g., IMS nodes, other UEs) such as via a network. The communications interface(s) 714 may facilitate transmitting and receiving wired and/or wireless signals over any suitable communications/data technology, standard, or protocol, as described herein. For example, the communications interface(s) 714 can comprise one or more of a cellular radio, a wireless (e.g., IEEE 802.1x-based) interface, a Bluetooth® interface, and so on. The communications interface(s) 714 may further enable the UE 102 to communicate over circuit-switched domains and/or packet-switched domains.

In various embodiments, the computer-readable memory 704 comprises non-transitory computer-readable memory 704 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 704 may also be described as computer storage media and may include volatile and nonvolatile, removable and non-removable media implemented in any method or technology for storage of information, such as computer readable instructions, data structures, program modules, or other data. Computer-readable memory 704, removable storage 706 and non-removable storage 708 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 102. Any such computer-readable storage media may be part of the UE 102.

The memory 704 can include an IMS client 718 (including a fallback module 720). The IMS client 718 and fallback module 720 may represent computer-executable instructions (or logic) that, when executed, by the processor(s) 700, perform the various acts and/or processes disclosed herein.

Figure 8:
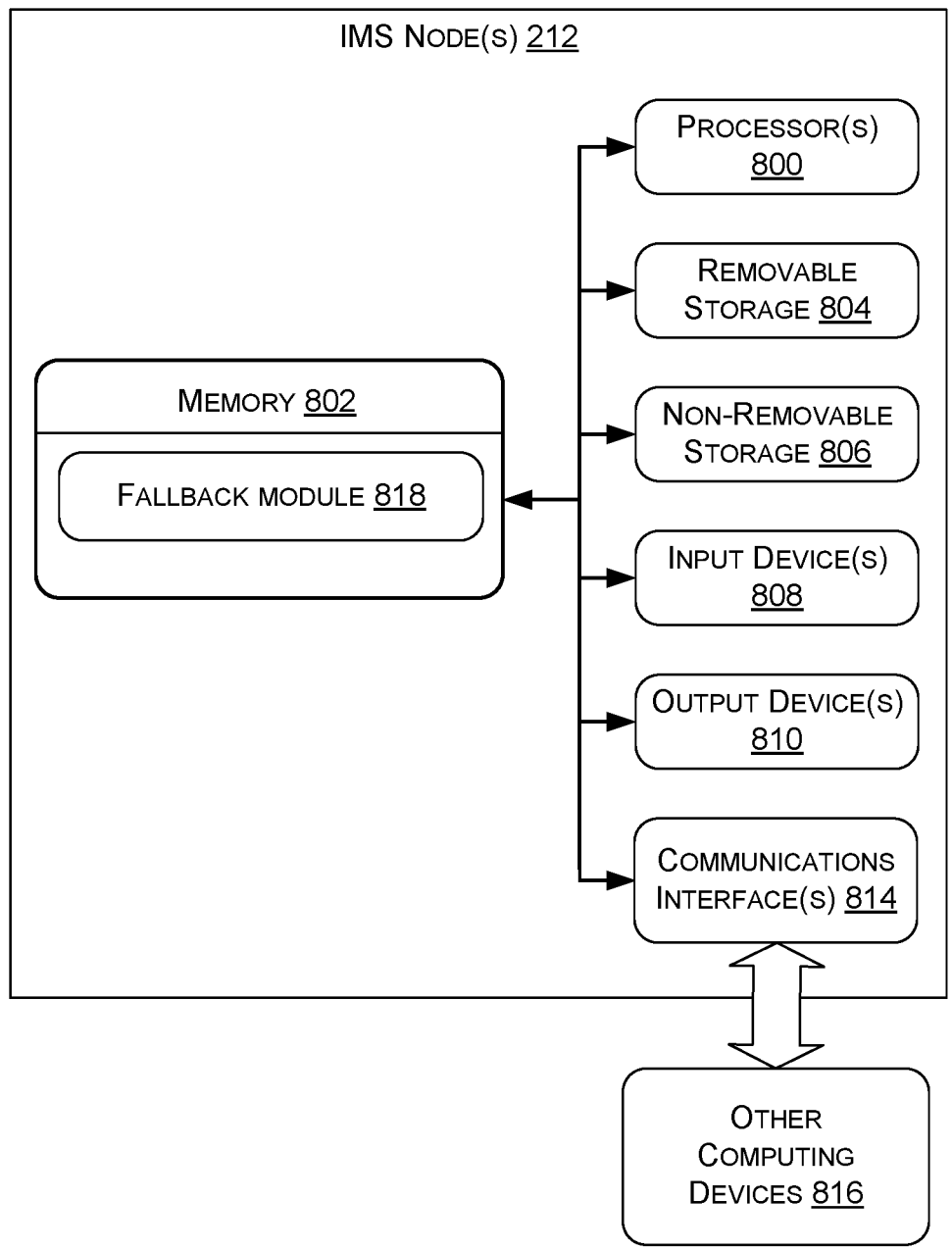
FIG. 8 is a block diagram of an example IMS node configured to exchange fallback indicators in SIP signaling.

FIG. 8 is a block diagram of an example IMS node(s) 212 configured to exchange fallback indicators in SIP signaling. The IMS node(s) 212 may be representative an IMS node of the IMS core 112 described herein.

As shown, the IMS node(s) 212 may include one or more processors 800 and one or more forms of computer-readable memory 802. The IMS node(s) 212 may also include additional storage devices. Such additional storage may include removable storage 804 and/or non-removable storage 806.

The IMS node(s) 212 may further include input devices 808 and output devices 810 communicatively coupled to the processor(s) 800 and the computer-readable memory 804. The IMS node(s) 212 may further include communications interface(s) 814 that allow the IMS node(s) 212 to communicate with other computing devices 816 (e.g., UEs) such as via a network. The communications interface(s) 814 may facilitate transmitting and receiving wired and/or wireless signals over any suitable communications/data technology, standard, or protocol, as described herein.

In various embodiments, the computer-readable memory 802 comprises non-transitory computer-readable memory 802 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 802 may also be described as computer storage media and may include volatile and nonvolatile, removable and non-removable media implemented in any method or technology for storage of information, such as computer readable instructions, data structures, program modules, or other data. Computer-readable memory 802, removable storage 804 and non-removable storage 806 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the IMS node(s) 212. Any such computer-readable storage media may be part of the IMS node(s) 212.

The memory 802 can include fallback module 818, which may represent computer-executable instructions (or logic)

that, when executed, by the processor(s) 800, perform the various acts and/or processes disclosed herein.

Figure 9:
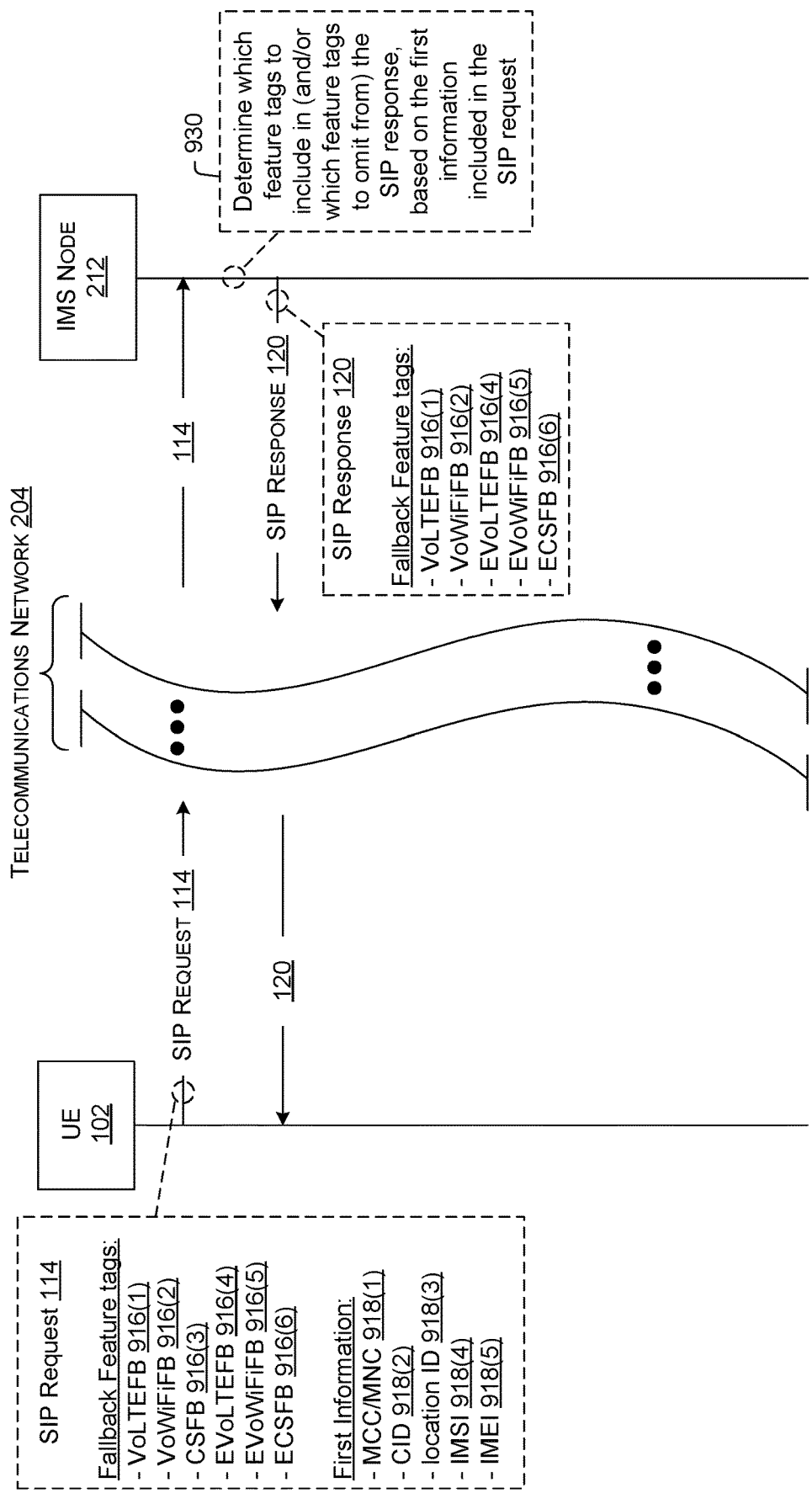
FIG. 9 is a diagram illustrating example signaling between a UE and an IMS node, the example signaling including a SIP request that includes fallback indicators (e.g., fallback feature tags) and first information. The IMS node in FIG. 9 determines which UE-supported Fallback RATs to authorize and/or not authorize based at least in part on the first information included in the SIP request.

FIG. 9 is a diagram illustrating example signaling between a UE 102 and an IMS node 212 over a telecommunications network 204. As shown in FIG. 9, the UE 102 may send a SIP request 114 over the telecommunications network 204. The SIP request 114 may, in some embodiments, represent a registration request that uses the SIP REGISTER method to request registration for one or more IMS-based services (e.g., voice calling services). As such, the UE 102 may send the SIP request 114 in idle mode (e.g., when a user is carrying the UE 102 in his or her pocket and not currently engaged in a communication session). Additionally, or alternatively, the SIP request 114 may be sent as a session request that uses the SIP INVITE method to request establishment of the communication session. As an example, the UE 102 may, in response to receiving user input to request establishment of a communication session (e.g., a user 104 dialing a number, uttering a name of a contact, selecting a contact, etc.), attempt to establish a communication session by sending the SIP request 114 using the SIP INVITE method.

The SIP request 114 may include one or more fallback indicators (e.g., the fallback indicators 116' introduced in FIG. 1A). In FIG. 9, these fallback indicators are shown in the form of feature tags 916(1), 916(2), 916(3), 916(4), 916(5), and 916(6). Although six feature tags 916(1)-(6) are included in the example SIP request 114 in FIG. 9, it is to be appreciated that any number of fallback indicators (e.g., feature tags 916) may be included in the SIP request 114, including a single feature tag 916 if the UE 102 supports a single Fallback RAT 118 and does not support any additional Fallback RATs 118. In any case, each feature tag 916 included in the SIP request 114 in FIG. 9 is different from the others to indicate a specific Fallback RAT 118.

FIG. 9 shows an example where each feature tag 916 is also associated with a particular type of communication session (e.g., an emergency-related communication session or a non-emergency-related communication session) that is supported by the UE 102. Having fallback indicators associated with a particular type of communication session, among multiple types of communication sessions, allows for controlling fallback procedures at a more granular level on the basis of the type of communication session (e.g., authorizing the use of a fallback RAT exclusively for emergency-related communication sessions). In the example of FIG. 9, the UE 102 may be a 5G-compliant UE that supports a 4G LTE RAT 108 as a Fallback RAT 118, and this Fallback RAT 118 may corresponding to multiple feature tags 916, such as the first feature tag 916(1) ("VoLTEFB" feature tag) and the fourth feature tag 916(4) ("EVoLTEFB" feature tag). These two example feature tags 916(1) and 916(4) are differentiated from each other on the basis of the type of communication session that is to be supported over the 4G LTE RAT 108; namely, the first feature tag 916(1) is used to indicate that normal (or non-emergency-related) communication sessions are supported over a 4G LTE RAT 108, while the fourth feature tag 916(4) is used to indicate that emergency-related communication sessions are supported over the 4G LTE RAT 108. As mentioned, this allows for authorizing the UE 102 to reattempt emergency-related communication sessions over a particular Fallback RAT 118, while prohibiting the UE 102 from reattempting non-emergency-related communication sessions over the same Fallback RAT 118.

The 5G-compliant UE 102 may also support a WiFi (or non-3GPP) RAT 108 as a Fallback RAT 118. There may be multiple feature tags 916 corresponding to this WiFi RAT 108, such as the second feature tag 916(2) ("VoWiFiFB" feature tag) for non-emergency-related communication sessions and to the fifth feature tag 916(5) ("EVoWiFiFB" feature tag) for emergency-related communication sessions. FIG. 9 also shows the UE 102 as supporting a circuit-switched RAT 108 as a Fallback RAT 118. There may be multiple feature tags corresponding to this circuit-switched RAT 108, such as the third feature tag 916(3) ("CSFB" feature tag) for non-emergency-related communication sessions and to the sixth feature tag 916(6) ("ECSFB" feature tag) for emergency-related communication sessions. In some embodiments, the feature tags 916 may be included in a header (e.g., the header 226) of the SIP request 114.

As shown in FIG. 9, the SIP request 114 may further include various forms of first information 918, which may include, without limitation, a mobile country code (MCC)/mobile network code (MNC) tuple 918(1), a cell identifier (CID) 918(2), a location identifier (ID) 918(3) indicative of a geographic location, an International Mobile Subscriber Identity (IMSI) 918(4), an International Mobile Equipment Identity (IMEI) 918(5), and/or any combination thereof. Thus, any such "first information" included in the SIP request 114 may be referred to as the "first information 918" herein, and may include some or all of the example first information shown in FIG. 9.

In some embodiments, the SIP request 114 may further include a private header (e.g., the private header 228, such as a PANI header) that specifies a particular RAT 108 that is available to the UE 102 for establishing a communication session, among other information that may be included in the private header. In some embodiments, the CID 918(2) may be included in the private header of the SIP request 114.

Ultimately, the SIP request 114 may be received by the IMS node 212. The IMS node 212 may read or parse the feature tags 916(1)-(6) (feature tag being a form of fallback indicator), and, at 930, the IMS node 212 may determine which UE-supported Fallback RATs 118 to authorize and/or not authorize based at least in part on the first information 918 included in the SIP request 114, and may indicate this determination by including some, all, or none of the feature tags 916(1)-(6) in, and/or omitting some, all, or none of the feature tags 916(1)-(6) from, a SIP response 120. Inclusion of a feature tag 916 in the SIP response 120 indicates that the corresponding Fallback RAT 118 is authorized, while omission of a feature tag 916 from the SIP response 120 indicates that the corresponding Fallback RAT 118 is not authorized. In order to make the determination at 930, the IMS node 212 may consider (or evaluate) one or more criteria based on the first information 918 that is included in the SIP request 114.

A first example criterion that can be evaluated to make the determination at 930 is whether a MCC/MNC tuple 918(1) in the SIP request 114 corresponds to a particular MCC/MNC tuple among multiple MCC/MNC tuples, or whether the MCC/MNC tuple 918(1) in the SIP request 114 is within a predefined range of MCC/MNC tuples. A MCC may be a 3 digit numerical identifier, and a MNC may be a 2 or 3 digit identifier. In combination, the MCC and the MNC form a tuple that uniquely identifies a network associated with a mobile network operator. In some cases, a MCC/MNC tuple can be considered a Public Land Mobile Network (PLMN) ID, because a PLMN is a network that provides land mobile telecommunications services to the public and is identified by a MCC/MNC tuple.

A single mobile network operator—such as the operator (e.g., a wireless carrier) of the telecommunications network 204—may be associated with (e.g., assigned) multiple MCC/MNC tuples, each corresponding to a distinct network that is maintained, operated, and/or utilized by the mobile network operator. This may be the case for various reasons, such as when the mobile network operator has merged with another mobile network operator and subsumes the purchased entity's underlying network infrastructure and customer base. In this scenario, a first group of users (or customers) (e.g., those associated with an entity that was bought by a primary mobile network operator) may be associated with a first MCC/MNC tuple that identifies the network of the purchased entity, which is now maintained, operated, and/or utilized by the primary mobile network operator. Meanwhile, a second group of users (or customers) who subscribed to the primary mobile network operator's services prior to the merger may still be assigned a second MCC/MNC tuple that is different than the first MCC/MNC tuple.

In another example, a first MCC/MINC tuple may uniquely identify a MVNO, while a second MCC/MNC tuple may uniquely identify a primary mobile network operator. A "MVNO" is a wireless communications services provider that does not own the wireless network infrastructure over which it provides services to its customers. Instead, a primary mobile network operator may enter into a business agreement with the MVNO to allow the MVNO to utilize the primary's network infrastructure. In this scenario, the IMS node 212 may receive SIP requests 114 from UEs 102 of both types of users (e.g., customers of the MVNO, and customers of the primary operator).

In any case, the IMS node 212 may compare the MCC/MNC tuple 918(1) in the SIP request 114 to multiple MCC/MNC tuples (e.g., to see if it matches a particular one of the multiple MCC/MNC tuples), or to a predefined range of MCC/MNC tuples (e.g., to see if it falls within the predefined range) in order to determine whether the criterion is met for authorizing (or prohibiting) the use of one or more Fallback RATs 118. If the criterion is met (e.g., if the MCC/MNC tuple 918(1) corresponds to a particular MCC/MNC tuple, or is within a predefined range of MCC/MNC tuples) at 930, the IMS node 212 may include some or all of the feature tags 916(1)-(6) in, or may omit some or all of the feature tags 916(1)-(6) from, the SIP response 120. FIG. 9 shows an example where the third feature tag 916(3) is omitted from the SIP response 120. Thus, the determination at 930 may be to prohibit the use of a circuit-switched RAT 108 as a Fallback RAT 118 for reattempting non-emergency-related communication sessions if the MCC/MNC tuple 918(1) corresponds to a particular MCC/MNC tuple, or is within a predefined range of MCC/MNC tuples. Alternatively, the determination at 930 may be to authorize the use of the UE-supported Fallback RATs 118 for everything but non-emergency related communication session reattempts over a circuit-switched RAT 108. In other words, the IMS node 212 may determine to omit the third feature tag 916(3) from the SIP response 120, or to include the remaining feature tags (i.e., 916(1), 916(2), 916(4), 916(5), and 916(6)) in the SIP response 120, based on the MCC/MNC-related criterion being met.

This MCC/MNC-based fallback control mechanism allows a mobile network operator to, for instance, provide some or all fallback services exclusively to UEs 102 or users 104 associated with a primary carrier brand, while sub-brands or roaming users associated with different MNC/MCC tuples are prohibited from using the same fallback services, or vice versa. In another example, users 104 associated with a MVNO operator may be prohibited from using particular Fallback RATs 118, while users of a primary carrier brand may be authorized to use the particular Fallback RATs 118, or vice versa. This may be done because a primary carrier's planned capacity is limited to a particular group of users 104, and the primary carrier may want to limit the authorization of fallback procedures to that group of users 104 for which it has planned capacity, while other groups of users 104 are not permitted to use the fallback procedures their UEs 102 might otherwise support, so as to not overload the network.

Another example criterion that can be evaluated to make the determination at 930 is whether the CID 918(2) corresponds to a particular CID among multiple CIDs, or whether the CID 918(2) is within a predefined range of CID values. A "CID" is a generally unique number used to identify a cell site (e.g., a base transceiver station (BTS), a sector of a BTS within a location area code (LAC), etc.). Because cell sites are located at different geographic locations, the CID 918(2) that is included in the SIP request 114 may specify, or may be used determine, a location of a particular cell site of a RAN that is being utilized by the UE 102 to send the SIP request 114. Thus, the CID 918(2) can be used by the IMS node 212 to selectively authorize fallback procedures according to the geographic location of the UEs 102 from which the IMS node 212 receives SIP requests 114.

The CID 918(2) may also specify, or may be used to determine, a radio technology that is employed by the UE 102, such as whether the UE 102 sends the SIP request 114 over a 5G cell, a 4G cell, a 3G cell, and so on. Thus, the CID 918(2) can additionally, or alternatively, be used by the IMS node 212 to selectively authorize fallback procedures according to the radio technology utilized by the UE 102 that sent the SIP request 114. The IMS node 212 may have access to a list of multiple CIDs for various cell sites within various geographic area(s).

Accordingly, the IMS node 212 may, at 930, compare the CID 918(2) in the SIP request 114 to multiple CIDs (e.g., to see if it matches a particular one of the multiple CIDs), or to a predefined range of CID values (e.g., to see if it falls within the predefined range) in order to determine whether the criterion is met for authorizing (or prohibiting) the use of a Fallback RAT 118. If the criterion is met (e.g., if the CID 918(2) corresponds to a particular CID, or is within a predefined range of CID values) at 930, the IMS node 212 may include some or all of the feature tags 916(1)-(6) in, or may omit some or all of the feature tags 916(1)-(6) from, the SIP response 120. For instance, the IMS node 212 may omit the third feature tag 916(3) from the SIP response 120, as shown in FIG. 9.

This CID-based fallback control mechanism allows a mobile network operator to, for instance, provide some or all fallback services exclusively to UEs 102 or users 104 in a particular geographic location. Here, geographic location may be defined at any suitable level of granularity to include geographic areas (e.g., a geographic area covered by a single cell site or multiple cell sites). It can be appreciated that such a geographic area may be contiguous or non-contiguous, as defined by multiple CIDs associated with respective cell sites.

Additionally, or alternatively, the CID-based fallback control mechanism can be used to provide some or all fallback services exclusively to UEs 102 that are capable of using a particular radio technology. For instance, fallback services can be authorized for 5G-compliant UEs 102 that send SIP requests 114 over 5G cells, while legacy UEs that are not 5G-compliant, and thereby send SIP requests 114 using legacy radio cells, may be prohibited from using the same fallback services as those authorized for use by the 5G-compliant UEs 102, or vice versa. Segmenting a user population or a device population based on CIDs 918(2) included in SIP requests 114 can be done for capacity planning purposes, similar to the discussion above with respect to MCC/MNC tuples. Additionally, or alternatively, the CID-based fallback control mechanism may be used to cautiously roll out a new radio technology (e.g., by authorizing fallback services for one particular geographic location (e.g., region, area, etc.) at a time, making sure that any technical issues associated with a new radio technology are resolved in each geographic region before deploying it at a larger scale).

Yet another example criterion that can be evaluated to make the determination at 930 is whether a geographic location specified by, or derived from, the location identifier (ID) 918(3) in the SIP request 114 corresponds to a particular geographic location. In some embodiments, the location ID 918(3) may be provided as a "Presence Information Data Format—Location information Object (PIDF-LO)," which may be provided in extensible markup language (XML) format. In some embodiments, the location ID 918(3) is an approximation, determined by the UE 102, at the time the SIP request 114 is sent. The location ID 918(3) can be provided in any suitable format, such as geodetic location (e.g., latitude and longitude coordinates), civic location (e.g., country, state, city, street address, apartment/unit number, and so on), or a combination of both geodetic and civic information. In some embodiments, the amount of granularity provided by civic location may be limited to a certain level (e.g., nothing beyond, or more specific, than the country level), or user consent may be required to provide more granularity to the location information.

The location ID 918(3) in the SIP request 114 may be derived from any suitable component available to the UE 102, such as a global positioning system (GPS) receiver of the UE 102, an application executing on the UE 102 that prompts the user to enter his/her current location, or the like. In some embodiments, the location ID 918(3) may be provided by crowdsourcing technology, such as by a client application of the UE 102 gathering Wi-Fi signatures in its vicinity, and the like.

In any case, the IMS node 212 may compare the geographic location specified by, or derived from, the location ID 918(3) in the SIP request 114 to determine whether the geographic location corresponds to a particular geographic location (e.g., one that matches a particular geographic location, one that is located within a geographic area/region, etc.) in order to determine whether the criterion is met for authorizing (or prohibiting) the use of one or more Fallback RATs 118. Again, geographic location, in this context, may be defined at any suitable level of granularity to include geographic areas (e.g., cities, counties, states, countries, continents, etc.). If the criterion is met (e.g., if the geographic location corresponds to a particular geographic location) at 930, the IMS node 212 may include some or all of the feature tags 916(1)-(6) in, or may omit some or all of the feature tags 916(1)-(6) from, the SIP response 120. For instance, the IMS node 212 may omit the third feature tag 916(3) from the SIP response 120, as shown in FIG. 9.

This location-based fallback control mechanism may be useful in situations where a CID, such as the CID 918(2), is not available, and is therefore not included in the SIP request 114. For instance, the UE 102 may invoke a Wi-Fi calling service to establish a communication session without using a cell site. This may allow an operator to authorize fallback services for users/devices that employ domestic Wi-Fi calling, and to prohibit fallback services for users/devices that employ international Wi-Fi calling, or vice versa. In some embodiments, a location-based fallback control mechanism may be based on a registered emergency address for the user 104, rather than a location ID 918(3) that is provided in the SIP request 114.

Yet another example criterion that can be evaluated to make the determination at 930 is whether an IMSI 918(4) in the SIP request 114 corresponds to a particular IMSI among multiple IMSIs, or whether the IMSI 918(4) in the SIP request 114 is within a predefined range of IMSI values. An "IMSI" is used to identify a user 104 of a telecommunications network 204, and is therefore associated with the user 104 of the UE 102 that sent the SIP request 114. The IMSI 918(4) may be a 15 digit (or fewer digit) number stored as a 64 bit field.

Accordingly, the IMS node 212 may compare the IMSI 918(4) in the SIP request 114 to multiple IMSIs (e.g., to see if it matches a particular one of the multiple IMSIs), or to a predefined range of IMSI values (e.g., to see if it falls within the predefined range) in order to determine whether the criterion is met for authorizing (or prohibiting) the use of one or more Fallback RATs 118. If the criterion is met (e.g., if the IMSI 918(4) corresponds to a particular IMSI, or is within a predefined range of IMSI values) at 930, the IMS node 212 may include some or all of the feature tags 916(1)-(6) in, or may omit some or all of the feature tags 916(1)-(6) from, the SIP response 120. For instance, the IMS node 212 may omit the third feature tag 916(3) from the SIP response 120, as shown in FIG. 9.

This IMSI-based fallback control mechanism allows a mobile network operator to, for instance, provide some or all fallback services exclusively to UEs 102 of users 104 who have prepaid wireless plans, while users 104 who have postpaid wireless plans are prohibited from using the same fallback services, or vice versa. This is because prepaid users may be assigned a first range of IMSI values, while postpaid users may be assigned a second range of IMSI values.

Yet another example criterion that can be evaluated to make the determination at 930 is whether an IMEI 918(5) in the SIP request 114 corresponds to a particular IMSI among multiple IMEIs, or whether the IMEI 918(5) in the SIP request 114 is within a predefined range of IMEI values. A "IMEI" is a number that identifies wireless devices, such as the UE 102, and is typically used to identify valid devices to prevent theft of devices. Accordingly, the IMEI is device-specific, and is therefore associated with a particular UE 102.

Accordingly, the IMS node 212 may compare the IMEI 918(5) in the SIP request 114 to multiple IMEIs (e.g., to see if it matches a particular one of the multiple IMEIs), or to a predefined range of IMEI values (e.g., to see if it falls within the predefined range) in order to determine whether the criterion is met for authorizing (or prohibiting) the use of one or more Fallback RATs 118. If the criterion is met (e.g., if the IMEI 918(5) corresponds to a particular IMEI, or is within a predefined range of IMEI values) at 930, the IMS node 212 may include some or all of the feature tags 916(1)-(6) in, or may omit some or all of the feature tags 916(1)-(6) from, the SIP response 120. For instance, the IMS node 212 may omit the third feature tag 916(3) from the SIP response 120, as shown in FIG. 9.

This IMEI-based fallback control mechanism allows a mobile network operator to, for instance, provide some or all fallback services exclusively to particular types (e.g., makes and/or models) UEs 102 because the IMEI may indicate a device make and model. The IMEI may also be used to differentiate devices on the basis of their radio technology capabilities (e.g., 5G-compliant devices may be assigned IMEIs within a predefined range of IMEI values, while non-5G-compliant devices are assigned IMEIs outside of that predefined range for 5G-compliant devices). This may allow a mobile network operator to authorize fallback for 5G-compliant devices, while prohibiting the same fallback services to predecessor devices, or vice versa.

In general, some or all of the first information 918 shown in FIG. 9 can be used by the IMS node 212 to enable more fine-tuned fallback control so that it can control fallback procedures, not just for all users/devices, or on the individual user/device basis, but rather, for a user group or a device group. This gives a network operator more flexibility to control fallback procedures at UEs 102 in order to adjust the deployment of fallback services over time, or to adjust dynamically to changes in capacity, etc.

In any event, the inclusion of the feature tags 916(1), 916(2), 916(4), 916(5), and 916(6) in the SIP response 120, as shown in FIG. 9, indicates that the UE 102 is authorized to reattempt communication sessions using the RATs 108 corresponding to the included feature tags 916, and for the types of communication sessions that are associated with the included feature tags 916 (e.g., emergency vs. non-emergency sessions). Meanwhile, the omission of the feature tag 916(3) from the SIP response 120 indicates that the UE 102 is not authorized to reattempt communication sessions using a circuit-switched RAT 108 corresponding to the feature tag 916(3) for establishing a non-emergency-related communication session. Thus, the UE 102 will refrain from trying to reattempt establishment of a failed non-emergency-related communication session using the circuit-switched RAT 108 (1) corresponding to the omitted feature tag 916(3).

Figure 10:
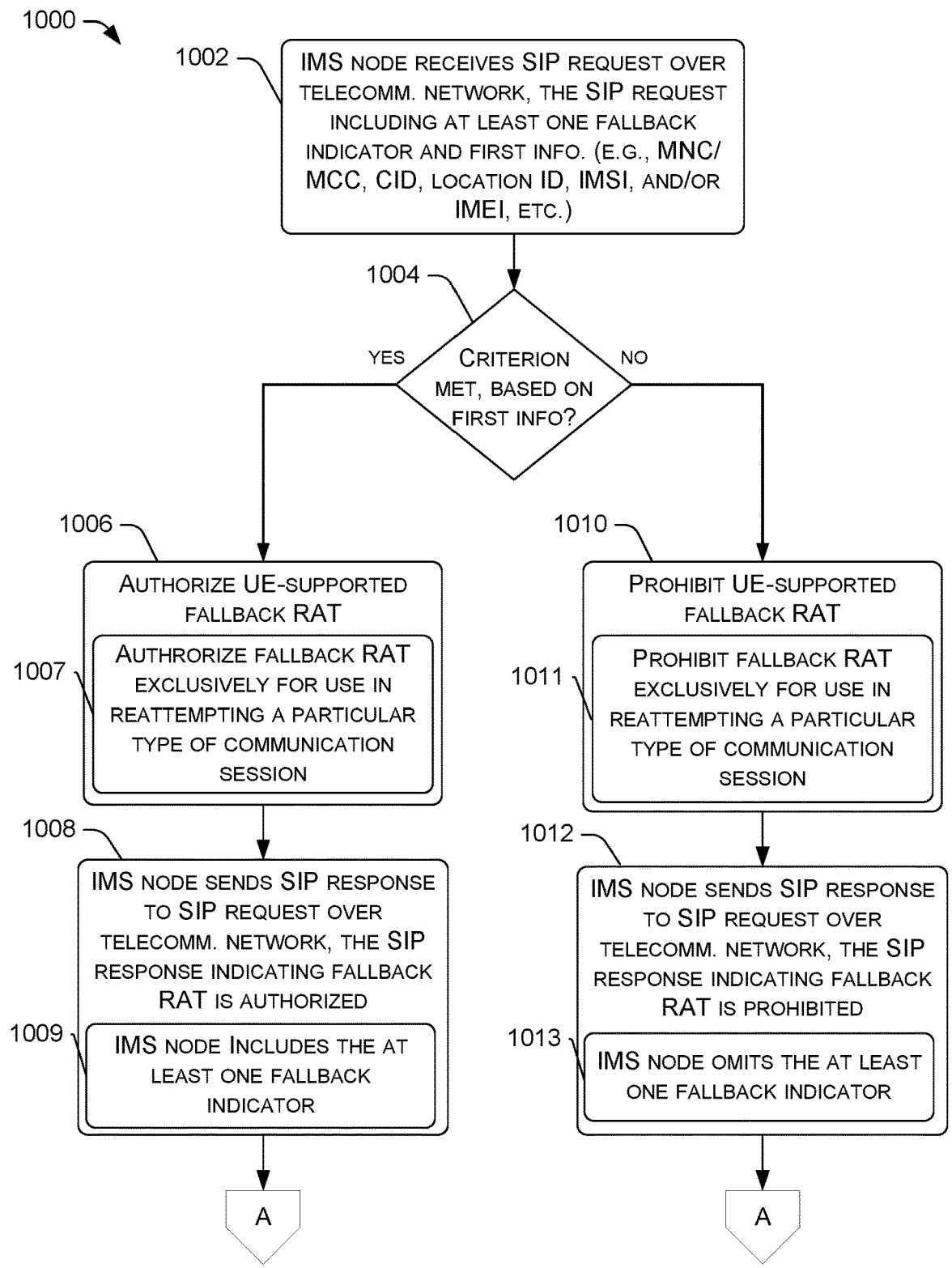
FIG. 10 illustrates a flowchart of an example process implemented by an IMS node to exchange fallback indicators with a UE in SIP signaling, and to determine which UE-supported Fallback RATs to authorize and/or not authorize based at least in part on first information included in a SIP request from the UE.

FIG. 10 illustrates a flowchart of an example process 1000 implemented by an IMS node 212 to exchange fallback indicators 116 with a UE 102 in SIP signaling, and to determine which UE-supported Fallback RATs 118 to authorize and/or not authorize based at least in part on first information 918 included in a SIP request 114 from the UE 102. The process 1000 is described, by way of example, with reference to the previous figures.

At 1002, an IMS node 212 may receive, over a telecommunications network 204, a SIP request 114 from a UE 102. The SIP request 114 may include one or more fallback indicators 116' indicating the capabilities of the UE 102 in terms of the Fallback RATs 118 the UE 102 supports. For example, the fallback indicators 116' included in the SIP request 114 may include a first fallback indicator 116'(1). In some embodiments, these fallback indicators 116' may comprise feature tags (e.g., 216, 916), and may be included in a header (e.g., the header 226) of the SIP request 114. The fallback indicators 116' may, in some cases, be associated with a particular type of communication session among multiple types of communication sessions. For instance, the first fallback indicator 116'(1) may be associated with emergency-related communication sessions, non-emergency-related communication sessions, or some other type of communication session. The SIP request 114 may further include first information, such as the first information 918 described in detail with respect to FIG. 9.

At 1002, the IMS node 212 may determine whether a criterion (or criteria) is met based at least in part on the first information 918 included in the SIP request 114. This can involve determining whether any, or all, of the criteria described above with reference to FIG. 9, is met for making the determination at 930 in FIG. 9. The criterion at block 1004 may be evaluated for purposes of determining which of the UE-supported Fallback RATs 118 (as indicated by the fallback indicators 116' in the SIP request 114) to authorize (if any), and which of the UE-supported Fallback RATs 118 not to authorize (if any).

If the criterion is met at block 1004, the process 1000 may follow the "YES" route to block 1006, where the IMS node 212 may determine, based at least in part on the criterion being met, to authorize the UE 102 to reattempt communication sessions using a Fallback RAT 118 corresponding to a fallback indicator 116 included in the SIP request 114. As mentioned, the individual fallback indicators 116 in the SIP request 114 may be associated with a particular type of communication session among multiple types of communication sessions (e.g., emergency-related communication sessions vs. non-emergency-related communication session). In this case, the authorization at block 1006 may involve determining, based at least in part on the criterion being met, to authorize the UE 102 to reattempt communication sessions of the particular type of communication session that is associated with the fallback indicator 116, using a Fallback RAT 118 corresponding to the fallback indicator 116, as shown by sub-block 1007.

At 1008, the IMS node 212 may send, over the telecommunications network 204, a SIP response 120 to the SIP request 114, the SIP response 120 including second information indicating that the UE 102 is authorized to reattempt communication sessions using the Fallback RAT 118 corresponding to the fallback indicator 116 in the SIP request 114. As mentioned, if the fallback indicator 116 is associated with a particular type of communication session, the second information in the SIP response 120 may indicate that the UE is authorized to reattempt communication sessions of the particular type of communication session using the Fallback RAT 118 corresponding to the fallback indicator 116 in the SIP request 114.

As indicated by sub-block 1009, in some embodiments, the IMS node 212 may include a fallback indicator 116" in the SIP response 120 to indicate the UE-supported Fallback RAT 118 is authorized for reattempting communication sessions. Accordingly, the second information included in SIP response 120 may be the inclusion of individual ones of the fallback indicators 116' in the SIP request 114, or answers (e.g., "yes", "authorized", etc.) associated with each of the fallback indicators 116" in the SIP response 120.

Returning to block 1004, if the criterion is not met (based on the first information 918 in the SIP request 114), the process 1000 may follow the "NO" route from block 1004 to block 1010, where the IMS node 212 may determine, based at least in part on the criterion not being met, to prohibit the UE 102 from reattempting communication sessions using a Fallback RAT 118 corresponding to a fallback indicator 116 included in the SIP request 114. Again, when the individual fallback indicators 116 in the SIP request 114 are associated with a particular type of communication session among multiple types of communication sessions (e.g., emergency-related communication sessions vs. non-emergency-related communication session), the prohibition at block 1010 may involve determining, based at least in part on the criterion being met, to prohibit the UE 102 from reattempting communication sessions of the particular type of communication session that is associated with the fallback indicator 116, using a Fallback RAT 118 corresponding to the fallback indicator 116, as shown by sub-block 1011.

At 1012, the IMS node 212 may send, over the telecommunications network 204, a SIP response 120 to the SIP request 114, the SIP response 120 including second information indicating that the UE 102 is not authorized to reattempt communication sessions using the Fallback RAT 118 corresponding to the fallback indicator 116 in the SIP request 114. As mentioned, if the fallback indicator 116 is associated with a particular type of communication session, the second information in the SIP response 120 may indicate that the UE is not authorized to reattempt communication sessions of the particular type of communication session using the Fallback RAT 118 corresponding to the fallback indicator 116 in the SIP request 114.

As indicated by sub-block 1013, in some embodiments, the IMS node 212 may omit a fallback indicator 116" from the SIP response 120 to indicate the UE-supported Fallback RAT 118 is not authorized for reattempting communication sessions. Accordingly, the second information included in SIP response 120 may be the omission of individual ones of the fallback indicators 116' from the SIP request 114, or answers (e.g., "no", "not authorized", etc.) associated with each of the fallback indicators 116" in the SIP response 120.

It is to be appreciated that the "YES" and "NO" routes from block 1004 may be reversed, such that the IMS node 212 would prohibit the use of a Fallback RAT 118 if the criterion is met, rather than authorizing the use of the Fallback RAT 118 if the criterion is met. Furthermore, as shown by the off-page reference "A" in FIGS. 4 and 10, the process 1000 may continue from either of blocks 1008 or 1012 to block 408 of the process 400, where the UE 102 invokes fallback procedures according to the authorization/prohibition of a particular Fallback RAT 118 using the process 1000.

Figure 11:
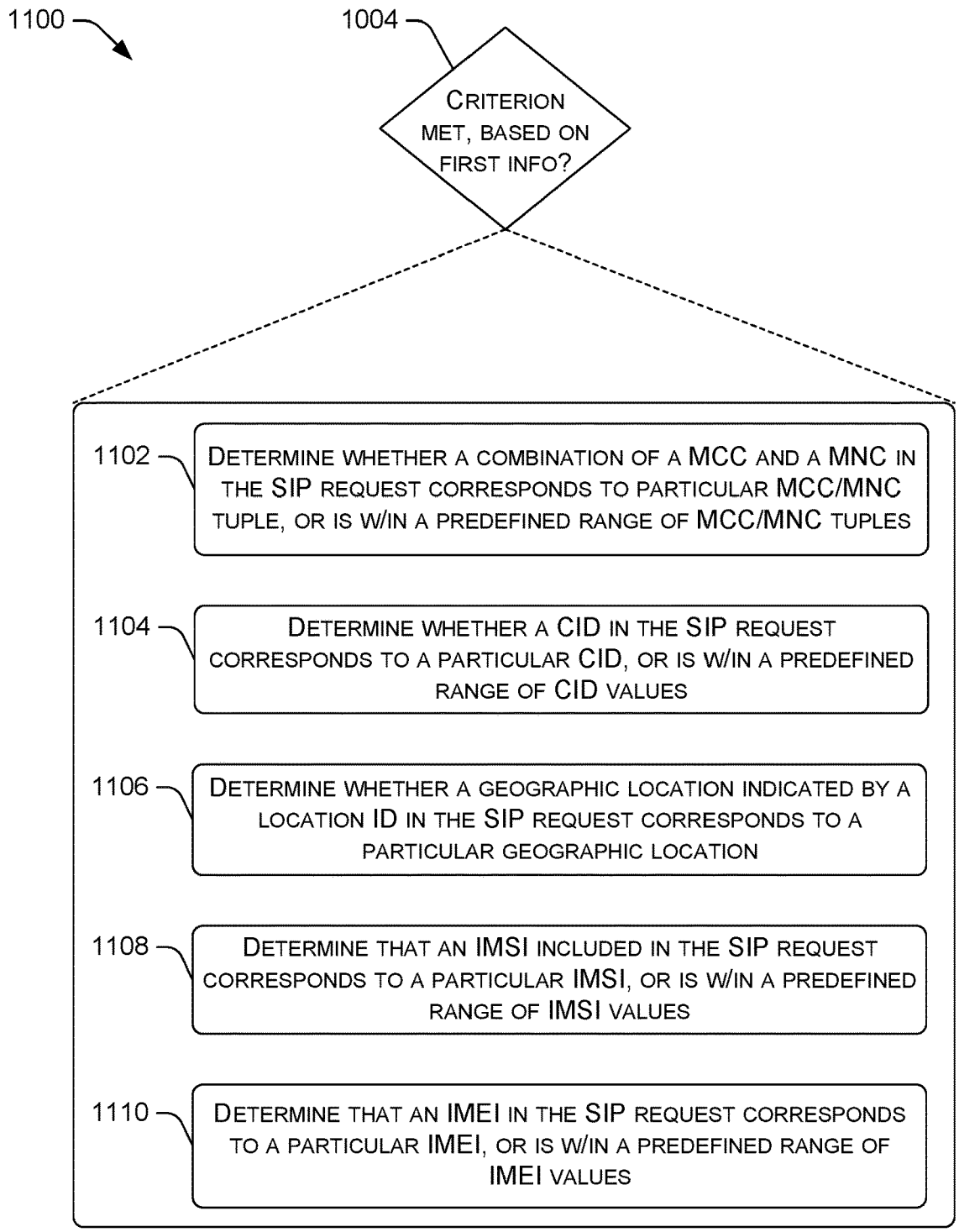
FIG. 11 illustrates a flowchart of example IMS node operations that can be performed in order to evaluate a criterion, based on first information included in a SIP request from a UE, the criterion for authorizing and/or not authorizing UE-supported Fallback RATs.

FIG. 11 illustrates a flowchart of example IMS node operations that can be performed as a process 1100 in order to evaluate a criterion, based on first information 918 included in a SIP request 114 from a UE, the criterion for authorizing and/or not authorizing UE-supported Fallback RATs 118. The process 1100 is described by way of example with reference to the previous figures. Furthermore, as indicated in FIG. 11, the process 1100 may represent sub-operations that are performed at block 1004 of the process 1000 of FIG. 10, which assumes that the IMS node 212 is already in receipt of a SIP request 114 from a UE 102, the SIP request 114 including one or more fallback indicators 116'.

At 1102, the IMS node 212 may determine whether the MCC/MNC tuple 918(1) (i.e., a combination of a MCC and a MNC) in the SIP request 114 (i) corresponds to a particular MCC/MNC tuple among multiple MCC/MNC tuples, or (ii) is within a predefined range of MCC/MNC tuples. If the MCC/MNC tuple 918(1) corresponds to a particular MCC/MNC tuple, or is within a predefined range of MCC/MNC tuples, the criterion may be considered to be met at block 1004.

Additionally, or alternatively, at 1104, the IMS node 212 may determine whether the CID 918(2) in the SIP request 114 (i) corresponds to a particular CID among multiple CIDs, or (ii) is within a predefined range of CID values. If the CID 918(2) corresponds to a particular CID, or is within a predefined range of CID values, the criterion may be considered to be met at block 1004.

Additionally, or alternatively, at 1106, the IMS node 212 may determine whether a geographic location specified by, or derived from, a location ID 918(3) in the SIP request 114 (i) corresponds to a particular geographic location. If the geographic location specified by, or derived from, the location ID 918(3) corresponds to a particular geographic location, the criterion may be considered to be met at block 1006.

Additionally, or alternatively, at 1108, the IMS node 212 may determine whether the IMSI 918(4) in the SIP request 114 (i) corresponds to a particular IMSI among multiple IMSIs, or (ii) is within a predefined range of IMSI values. If the IMSI 918(4) corresponds to a particular IMSI, or is within a predefined range of IMSI values, the criterion may be considered to be met at block 1008.

Additionally, or alternatively, at 1110, the IMS node 212 may determine whether the IMEI 918(5) in the SIP request 114 (i) corresponds to a particular IMEI among multiple IMEIs, or (ii) is within a predefined range of IMEI values. If the IMEI 918(5) corresponds to a particular IMEI, or is within a predefined range of IMEI values, the criterion may be considered to be met at block 1010.

It is to be appreciated that multiple criteria may be evaluated (e.g., some or all of the sub-blocks 1102-1110), and the criterion may be considered to be met if the multiple criteria are met. In other words, a single criterion may not be sufficient, in some cases, and the determination as to whether to authorize (or prohibit) the use of a Fallback RAT(s) 118 in reattempting communication sessions may be based on multiple criteria being met.

Figure 12:
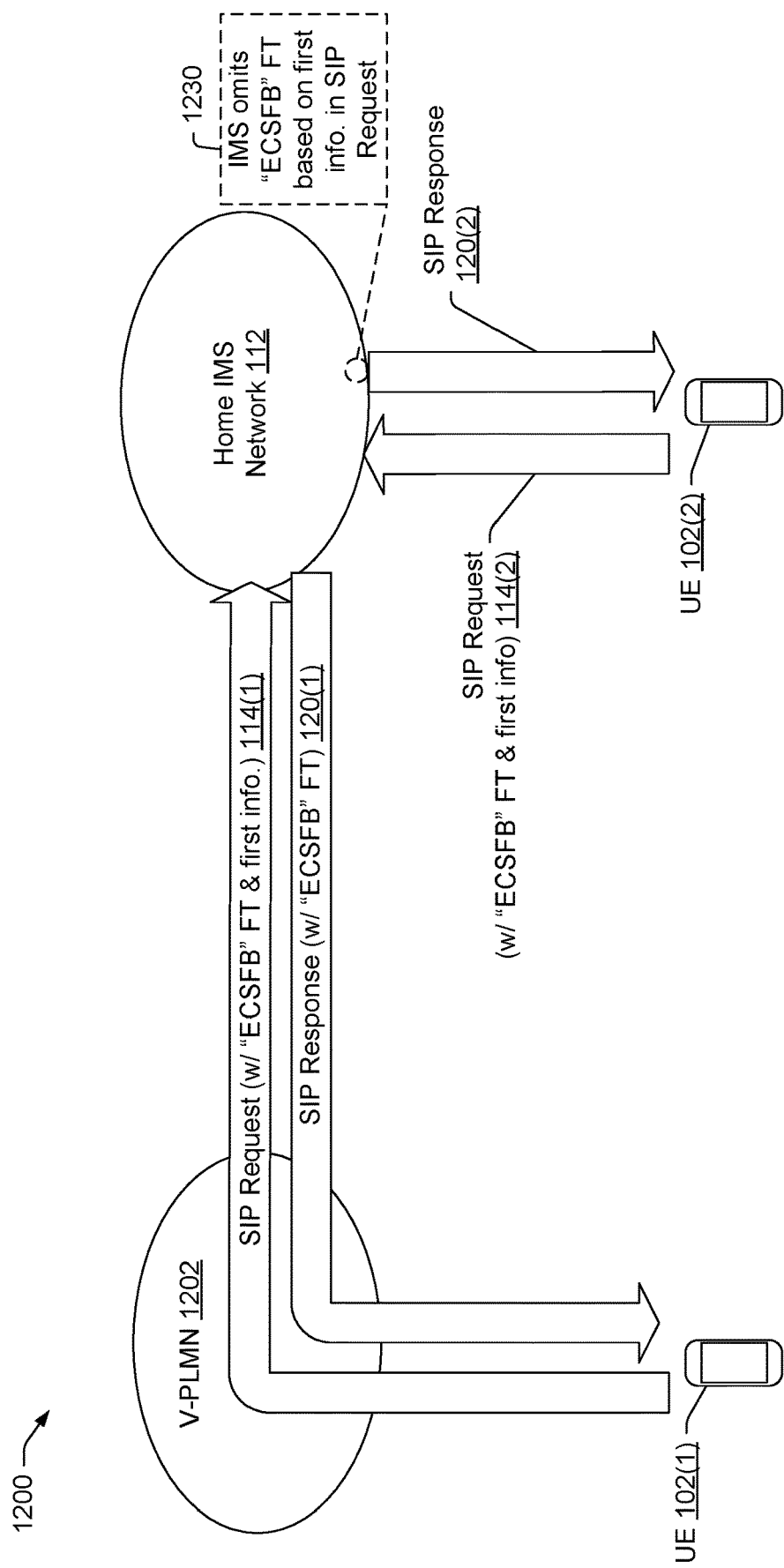
FIG. 12 is a diagram showing an example environment to illustrate an example fallback control technique that shows the distinction between a home user and a roaming user.

FIG. 12 is a diagram showing an example environment 1200 to illustrate an example fallback control technique that shows the distinction between a home user and a roaming user. A first UE 102(1) represents a roaming device, and a second UE 102(2) represents a device that is not roaming. Accordingly, a first SIP request 114(1) (e.g., a registration request, a session request, etc.) from the first UE 102(1) is sent to a Visited PLMN (V-PLMN) 1202 because the first UE 102(1), being a roaming device, is registered, or is to be registered, at the V-PLMN 1202. The first SIP request 114(2) may be routed by the V-PLMN 1202 to a Home IMS network 112 (e.g., a Home PLMN) for processing of the first SIP request 114(1). Meanwhile, a second SIP request 114(2) from the second UE 102(2) is sent directly to the Home IMS network 112 because the second UE 102(2) is not a roaming device.

Both the first SIP request 114(1) and the second SIP request 114(2) include at least one fallback indicator 116 (e.g., an "ECSFB" feature tag 916), indicating that both UEs 102(1) and 102(2) are capable of falling back to a circuit-switched RAT 108 for use in reattempting communication sessions if an issue arises inhibiting the establishment of a first attempt using a preferred radio technology (e.g., 5G). In addition, both the first SIP request 114(1) and the second SIP request 114(2) also include first information 918. This first information 918 can include any of the example types of first information 918 described herein, such as a MCC/MNC tuple 918(1). Here, because the first UE 102(1) is a roaming UE and the second UE 102(2) is not a roaming UE, the first information in each SIP request 114 may differ. For example, each SIP request 114 may include a different MCC/MNC tuple 918(1), a different CID 918(2), etc., with respect to the other SIP request 114. This allows the Home IMS network 112 to distinguish the two UEs 102(1) and 102(2) from each other, and to make a determination, at 1230, to omit the "ECSFB" feature tag 916 from the second SIP response 120(2), and/or to include the "ECSFB" feature tag 916 in the first SIP response 120(1), or vice versa. Thus, in the example of FIG. 12, the "ECSFB" feature tag 916 is included in the SIP response 120(1), meaning that the first UE 102(1) is authorized to reattempt emergency-related communication sessions using a circuit-switched Fallback RAT 118 corresponding to the "ECSFB" feature tag 916. Meanwhile, the "ECSFB" feature tag 916 is omitted from the SIP response 120(2), meaning that the second UE 102(2) is prohibited from reattempting emergency-related communication sessions using a circuit-switched Fallback RAT 118 corresponding to the "ECSFB" feature tag 916.

The approach of FIG. 12 may be beneficial in a case where an operator of the Home IMS network 112 has discontinued the use of a circuit-switched network as part of its own network infrastructure, and, therefore, the operator does not want its UEs 102 wasting time and/or computing resources scanning for a circuit-switched RAT 108 that is not available to the UEs 102. However, it may be the case that a roaming partner's network has not yet discontinued their circuit-switched network, and, therefore, the Home operator may determine to authorize roaming UEs 102 to reattempt emergency-related communication sessions using a circuit-switched Fallback RAT 118 of the roaming partner's network, if a primary communication session cannot be established for some reason. This also allows for discontinuing a combined attached procedure by the non-roaming UE 102 (2), which can otherwise be a waste of resources if there is no available circuit-switched network to which the UE 102(2) can fallback.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A method comprising:
receiving, by an Internet Protocol Multimedia Subsystem (IMS) node and over a telecommunications network, a Session Initiation Protocol (SIP) request from a user equipment (UE), the SIP request including:
a fallback indicator; and
first information;
determining that a criterion is met based at least in part on the first information included in the SIP request;
determining, based at least in part on the criterion being met, to authorize the UE to reattempt communication sessions using a fallback radio access technology corresponding to the fallback indicator; and
sending, by the IMS node and over the telecommunications network, a SIP response to the SIP request, the SIP response including second information indicating that the UE is authorized to reattempt communication sessions using the fallback radio access technology.

2. The method of claim 1, further comprising:
attempting to establish a communication session for the UE over the telecommunications network using a particular radio access technology that is available to the UE at a time of the attempting; and
in response to an issue inhibiting the communication session from being established using the particular radio access technology, reattempting to establish the communication session for the UE using the first fallback radio access technology.

3. The method of claim 1, wherein:
the first information included in the SIP request comprises a combination of a mobile country code (MCC) and a mobile network code (MNC); and
the determining that the criterion is met comprises determining that the combination of the MCC and the MNC (i) corresponds to a particular MCC/MNC tuple among multiple MCC/MNC tuples, or (ii) is within a predefined range of MCC/MNC tuples.

4. The method of claim 1, wherein:
the first information included in the SIP request comprises a cell identifier (CID) associated with a cell site of a radio access network utilized by the UE to send the SIP request over the telecommunications network to the IMS node; and
the determining that the criterion is met comprises determining that the CID (i) corresponds to a particular CID among multiple CIDs, or (ii) is within a predefined range of CID values.

5. The method of claim 1, wherein:
the first information included in the SIP request comprises a location identifier (ID) indicative of a geographic location; and
the determining that the criterion is met comprises determining that the geographic location corresponds to a particular geographic location.

6. The method of claim 1, wherein:
the first information included in the SIP request comprises an International Mobile Subscriber Identity (IMSI) associated with a user of the UE; and
the determining that the criterion is met comprises determining that the IMSI (i) corresponds to a particular IMSI among multiple IMSIs, or (ii) is within a predefined range of IMSI values.

7. The method of claim 1, wherein:
the first information included in the SIP request comprises an International Mobile Equipment Identity (IMEI) associated with the UE; and
the determining that the criterion is met comprises determining that the IMEI (i) corresponds to a particular IMEI among multiple IMEIs, or (ii) is within a predefined range of IMEI values.

8. An Internet Protocol Multimedia Subsystem (IMS) node comprising:
a processor; and
memory storing computer-executable instructions that, when executed by the processor, cause the IMS node to:
receive, over a telecommunications network, a Session Initiation Protocol (SIP) request from a user equipment (UE), the SIP request including:
a fallback indicator; and
first information;
determine that a criterion is met based at least in part on the first information included in the SIP request;

determine, based at least in part on the criterion being met, to not authorize the UE to reattempt communication sessions using a fallback radio access technology corresponding to the fallback indicator; and send, over the telecommunications network, a SIP response to the SIP request, the SIP response including second information indicating that the UE is not authorized to reattempt communication sessions using the fallback radio access technology.

9. The IMS node of claim 8, wherein the computer-executable instructions, when executed by the processor, further cause the IMS node to:

attempt to establish a communication session for the UE over the telecommunications network using a particular radio access technology that is available to the UE at a time of attempting to establish the communication session; and in response to an issue inhibiting the communication session from being established using the particular radio access technology, refraining from reattempting to establish the communication session for the UE using the first fallback radio access technology.

10. The IMS node of claim 8, wherein:

the first information included in the SIP request comprises a combination of a mobile country code (MCC) and a mobile network code (MNC); and determining that the criterion is met comprises determining that the combination of the MCC and the MNC (i) corresponds to a particular MCC/MNC tuple among multiple MCC/MNC tuples, or (ii) is within a predefined range of MCC/MNC tuples.

11. The IMS node of claim 8, wherein:

the first information included in the SIP request comprises a cell identifier (CID) associated with a cell site of a radio access network utilized by the UE to send the SIP request over the telecommunications network to the IMS node; and determining that the criterion is met comprises determining that the CID (i) corresponds to a particular CID among multiple CIDs, or (ii) is within a predefined range of CID values.

12. The IMS node of claim 8, wherein:

the first information included in the SIP request comprises a location identifier (ID) indicative of a geographic location; and determining that the criterion is met comprises determining that the geographic location corresponds to a particular geographic location.

13. The IMS node of claim 8, wherein:

the first information included in the SIP request comprises an International Mobile Subscriber Identity (IMSI) associated with a user of the UE; and determining that the criterion is met comprises determining that the IMSI (i) corresponds to a particular IMSI among multiple IMSIs, or (ii) is within a predefined range of IMSI values.

14. The IMS node of claim 8, wherein:

the first information included in the SIP request comprises an International Mobile Equipment Identity (IMEI) associated with the UE; and determining that the criterion is met comprises determining that the IMEI (i) corresponds to a particular IMEI among multiple IMEIs, or (ii) is within a predefined range of IMEI values.

15. A method comprising:

receiving, by an Internet Protocol Multimedia Subsystem (IMS) node and over a telecommunications network, a Session Initiation Protocol (SIP) request from a user equipment (UE), the SIP request including:
 a fallback indicator associated with a particular type of communication session among multiple types of communication sessions; and
 first information;

determining that a criterion is met based at least in part on the first information included in the SIP request;

determining, based at least in part on the criterion being met, to authorize the UE to reattempt communication sessions of the particular type of communication session using a fallback radio access technology corresponding to the fallback indicator; and sending, by the IMS node and over the telecommunications network, a SIP response to the SIP request, the SIP response including second information indicating that the UE is authorized to reattempt communication sessions of the particular type of communication session using the fallback radio access technology.

16. The method of claim 15, wherein the particular type of communication session is an emergency-related communication session.

17. The method of claim 15, wherein:

the first information included in the SIP request comprises a combination of a mobile country code (MCC) and a mobile network code (MNC); and the determining that the criterion is met comprises determining that the combination of the MCC and the MNC (i) corresponds to a particular MCC/MNC tuple among multiple MCC/MNC tuples, or (ii) is within a predefined range of MCC/MNC tuples.

18. The method of claim 15, wherein:

the first information included in the SIP request comprises a cell identifier (CID) associated with a cell site of a radio access network utilized by the UE to send the SIP request over the telecommunications network to the IMS node; and the determining that the criterion is met comprises determining that the CID (i) corresponds to a particular CID among multiple CIDs, or (ii) is within a predefined range of CID values.

19. The method of claim 15, wherein:

the first information included in the SIP request comprises a location identifier (ID) indicative of a geographic location; and the determining that the criterion is met comprises determining that the geographic location corresponds to a particular geographic location.

20. The method of claim 15, wherein:

the first information included in the SIP request comprises at least one of an International Mobile Subscriber Identity (IMSI) associated with a user of the UE, or an International Mobile Equipment Identity (IMEI) associated with the UE; and the determining that the criterion is met comprises determining that:
 the IMSI (i) corresponds to a particular IMSI among multiple IMSIs, or (ii) is within a predefined range of IMSI values; or
 the IMEI (i) corresponds to a particular IMEI among multiple IMEIs, or (ii) is within a predefined range of IMEI values.

* * * * *